US006778945B2

(12) United States Patent
Chassin et al.

(10) Patent No.: US 6,778,945 B2
(45) Date of Patent: Aug. 17, 2004

(54) ROOFTOP PACKAGE UNIT DIAGNOSTICIAN

(75) Inventors: David P. Chassin, Pasco, WA (US); Robert G. Pratt, Kennewick, WA (US); Larry Dean Reid, Benton City, WA (US)

(73) Assignee: Battelle Memorial Institute, Richland, WA (US)

(*) Notice: Subject to any disclaimer, the term of this patent is extended or adjusted under 35 U.S.C. 154(b) by 254 days.

(21) Appl. No.: 10/020,849

(22) Filed: Dec. 12, 2001

(65) Prior Publication Data

US 2003/0110001 A1 Jun. 12, 2003

(51) Int. Cl.⁷ .................................................. G06F 11/00
(52) U.S. Cl. ........................ 702/188; 700/276; 700/278
(58) Field of Search ......................... 702/188; 700/276, 700/278

(56) References Cited

U.S. PATENT DOCUMENTS

| | | | |
|---|---|---|---|
| 3,979,922 A | 9/1976 | Shavit | |
| 4,289,272 A | 9/1981 | Murase et al. | |
| 4,408,169 A | 10/1983 | Fraser | |
| 5,061,916 A | 10/1991 | French et al. | |
| 5,103,391 A | 4/1992 | Barrett | |
| 5,276,630 A | 1/1994 | Baldwin et al. | |
| 5,292,280 A | * 3/1994 | Janu et al. | 454/229 |
| 5,301,553 A | 4/1994 | Schultz et al. | |
| 5,311,451 A | 5/1994 | Barrett | |
| 5,446,677 A | 8/1995 | Jensen et al. | |
| 5,597,354 A | 1/1997 | Janu et al. | |
| 5,682,329 A | 10/1997 | Seem et al. | |
| 5,822,369 A | 10/1998 | Araki | |
| 6,006,142 A | 12/1999 | Seem et al. | |
| 6,092,078 A | 7/2000 | Adolfsson | |
| 6,115,713 A | 9/2000 | Pascucci et al. | |
| 6,119,125 A | 9/2000 | Gloudeman et al. | |
| 6,148,306 A | 11/2000 | Seidl et al. | |
| 6,161,764 A | 12/2000 | Jatnieks | |
| 6,192,282 B1 | 2/2001 | Smith et al. | |
| 6,217,213 B1 | 4/2001 | Curry et al. | |
| 6,219,590 B1 | 4/2001 | Bernaden, III et al. | |

OTHER PUBLICATIONS

"NetBSD Documentation: Writing a pseudo device." Copyright© 1994–2001 The NetBSD Foundation, Inc.

18. Linux character device drivers.

"Use of a PC Printer Port for Control and Data Acquisition," *the Technology Interface*, Fall 1996. (link to *the Technology Interface*, the Electronic Journal for Engineering technology), pp 1–18. Et.nmsu.edu/~etti/fall96/com.

Copyright Ledgister, Floyd, et al. "PC Parallel Port—Sonar Control and Precise Timing Using External Counters," Jun. 13, 1996, pp. 1–17, the Chanda/ECSEL Project. Morgan State University, Baltimore, MD 21239, www.phanderson.com/printer/timing.html.

(List continued on next page.)

*Primary Examiner*—John Barlow
*Assistant Examiner*—Stephen J. Cherry
(74) *Attorney, Agent, or Firm*—Woodard, Emhardt, Moriarty, McNett & Henry LLP

(57) ABSTRACT

A diagnostic system for an HVAC system includes a number of sensors used to measure the operation of the HVAC system. Sensor readings are measured by timing the delay between when a strobe signal is sent to a sensor and when an interrupt signal from the sensor is received. A device driver used to measure the sensor readings stores the sensor readings in pseudo-character device files, which are universally accessible by different subsystems of the diagnostic system. Based on the readings from these sensors, this diagnostic system is able to determine the operational status of the HVAC system and if an economizer in the HVAC system is operating properly.

11 Claims, 26 Drawing Sheets

OTHER PUBLICATIONS

"The Parallel Port Manual—Use of a PC Printer Port for Control and Data Acquisition", vol. 1, copyright Peter H. Anderson, Baltimore, MD, Jan., 1996, Morgan State University, Department of Electrical Engineering. ISBN 0-9653357-0-4; LCCN 96-96562.

"The Parallel Port Manual—Use of a PC Printer Port for Control and Data Acquisition", vol. 2, copyright Peter H. Anderson, Baltimore, MD, Jan. 6, 1997, Morgan State University, Department of Electrical Engineering. ISBN 0-9653357.

* cited by examiner

ROOFTOP PACKAGE UNIT DIAGNOSTICIAN

GOVERNMENT RIGHTS

This invention was made with Government support under Contract Number DE-AC0676RLO1830 awarded by the U.S. Department of Energy. The Government has certain rights in the invention.

BACKGROUND OF THE INVENTION

The present invention generally relates to control systems, and more specifically, but not exclusively, relates to a heating, ventilation and air conditioning (HVAC) diagnostic system that can be monitored remotely by telephone or over a computer network.

Commercial grade HVAC systems are used to control the temperature and air quality of buildings, such as in offices, hospitals and manufacturing plants. Although the reliability of such systems has improved, occasional operational failures may still arise. Even when a HVAC system appears to be outwardly operating properly, it may have an internal problem that causes it to waste energy. Many factors can make troubleshooting these systems rather difficult. For example, the complexity of the controls and other systems in HVAC systems can make troubleshooting difficult. In addition, HVAC systems are usually located in areas that are hard for service technicians to access such as on rooftops. Since technicians typically cover large service territories, a service technician may not be always available to troubleshoot sporadic problems with the HVAC system. To make the technician's job even more difficult, the HVAC sensors that are used by the technician for diagnosing problems can be unreliable and sometimes can even be the source of the HVAC malfunction. Under certain circumstances the actions of the technicians, such as opening an access panel, can make diagnosis impossible by changing the operational characteristics of the system to a large extent so as to make data collection useless.

Therefoer, there has been a need for the ability to inexpensively and accurately diagnose problems with remotely located HVAC systems.

SUMMARY OF THE INVENTION

One form of the present invention is a unique method for sensing measurements in a HVAC system. Other forms of the invention include a unique method of diagnosing HVAC problems and a unique HVAC diagnostic system.

Another form concerns a method that includes calibrating a remote sensor interface by determining one or more calibration delay times for the remote sensor interface with a processor. A first signal is sent from the processor to the remote sensor interface. In response, a second signal is received at the processor from the remote sensor interface. A delay between the sending and receiving is timed with the processor. An output level of a sensor operatively coupled to the remote sensor interface is determined, which is a function of the delay and the calibration delay times.

A further form concerns a system that includes a sensor device operable to sense a reading from a machine and a processor that is operatively coupled to the sensor device. The processor is operable to send a first signal to the sensor device and to receive a second signal from the sensor device. The sensor device is operable to delay sending the second signal in proportion to the reading. The processor includes an internal clock operable to time a time delay between sending the first signal and receiving the second signal. The processor is operable to determine the reading from the sensor device based on the time delay.

In another form, a heating, ventilation and air conditioning unit includes a controller for controlling operation of the unit. A diagnostic device is operatively coupled to the unit, and the diagnostic device is operable to monitor status of the unit. The diagnostic device includes a processor operatively coupled to the controller, a clock operatively coupled to the processor, and one or more remote sensors attached to the unit. The remote sensors are operable to generate output voltages proportional to readings from the unit. One or more multiplexers are operatively coupled to the sensors and the processor to select one of the sensors to read. A voltage-controlled oscillator is operatively coupled to the multiplexers, and the voltage-controlled oscillator is operable to generate pulses at frequencies proportional to the output voltages from the sensors. A counter is operatively coupled to the voltage-controlled oscillator and the processor. The processor is operable to send one or more first signals to the counter. The counter is operable to send one or more second signals to the processor in response to the first signals after counting a predefined number of pulses from the voltage-controlled oscillator. The timer is operable to time delay times between sending the first signals and receiving the second signals at the processor. The processor is operable to determine the readings from the sensor devices based on the delay times. The diagnostic device is operable to determine the unit status of the unit based on the readings from the sensors and signals from the controller.

Another form concerns a method diagnosing an air treatment system with a fan. In the method, occupancy of a building is determined with a processor, and operational status of the fan is determined with the processor. The processor calculates an outdoor air fraction of the system and determines validity of the outdoor air fraction. The processor determines an outdoor air fraction status by comparing the outdoor air fraction to a required outdoor air fraction for the building. The processor determines current mode status by comparing the outdoor air fraction with current mode of operation of the system. The unit status of the system is based at least on the occupancy of the building, the operational status of the fan, the validity of the outdoor air fraction, the outdoor air fraction status, and the current mode status. Output is provided based at least in part on the unit status.

Another form concerns a system that includes means for calibrating a remote sensor interface by determining one or more calibration delay times for the remote sensor interface, means for sending a first signal to the remote sensor interface, means for receiving a second signal from the remote sensor interface in response to the first signal, and means for timing a delay time between the first and second signals. The delay time corresponds to a sensor reading. The system further includes means for determining the sensor reading based on the delay time and the calibration delay times.

Still yet another form of the present invention concerns a system that includes means for determining occupancy of a building. The building has an air treatment system with a fan. The system further includes means for determining operational status of the fan, means for calculating an outdoor air fraction of the system, means for determining validity of the outdoor air fraction, means for determining outdoor air fraction status by comparing the outdoor air fraction to a required outdoor air fraction for the building, and means for determining current mode status by comparing the outdoor air fraction with current mode of operation of the system. The unit status of the system is based at least on the occupancy of the building, operational status of the fan, the validity of the outdoor air fraction, the outdoor air fraction status, and the current mode status. The system includes means for providing output based at least in part on the unit status.

DESCRIPTION OF SELECTED EMBODIMENTS

Figure 1:
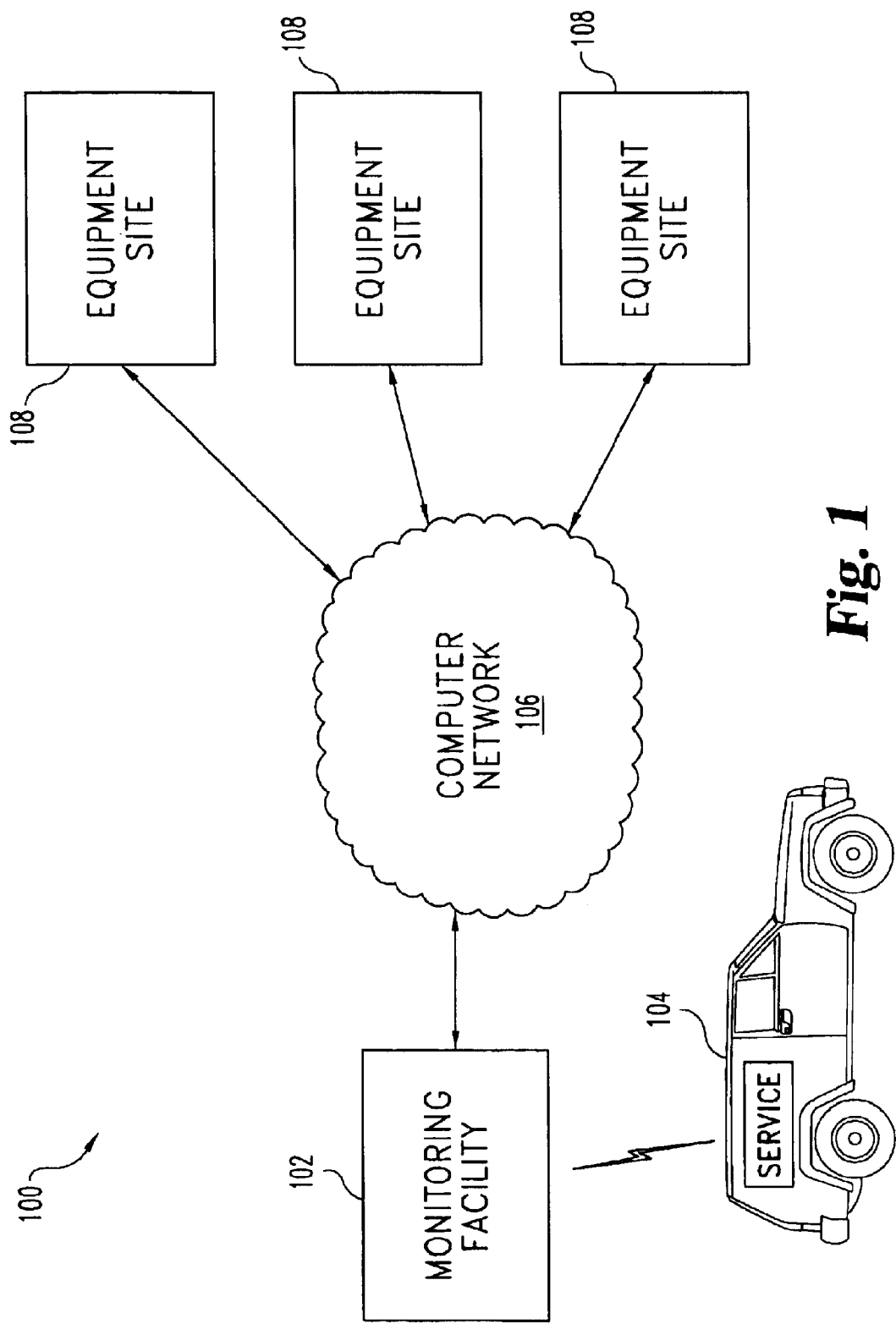
FIG. 1 shows a diagrammatic view of a monitoring system according to one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated embodiments and any further applications of the principles of the invention as described herein are contemplated as would occur to one skilled in the art to which the invention relates. One embodiment of the invention is shown in great detail, although it will be apparent to those skilled in the art that some features that are not relevant to the invention may not be shown for the sake of clarity.

A communication system 100 according to one embodiment of the present invention is illustrated in FIG. 1. The system 100 includes a monitoring facility 102, a remote service vehicle 104, a computer network 106 and one or more remotely located equipment sites 108. The monitoring facility 102 and the equipment sites 108 are operatively coupled to each other through computer network 106. The computer network 106 can include the Internet and/or one or more other wide area networks (WANs), a local area network (LAN), a telecommunication network, a proprietary network such as provided by America Online, Inc., a combination of these and/or other types of networks generally known to those skilled in the art. Through computer terminals, personal computers and/or other types of devices at monitoring facility 102, service technicians and other personnel can remotely monitor the operational status of multiple HVAC systems located at the different equipment sites 108. By remotely monitoring these equipment sites 108, technicians can be efficiently dispatched to service equipment sites 108 even before HVAC system failures occur. With the capability of remotely troubleshooting HVAC systems, technicians can properly equip themselves before travelling to the site 108. As illustrated, the service vehicle 104, which is used by the technician to commute to equipment site 108, is in radio communication with the monitoring facility 102. While the technician is commuting to (or is at) one of the equipment sites 108, the monitoring facility 102 can relay information about the problem and equipment status to the service technician in the service vehicle 104. It should be appreciated that the remote service vehicle 104 can be, alternatively or additionally, operatively coupled to the monitoring facility 102 through the computer network 106.

Figure 2:
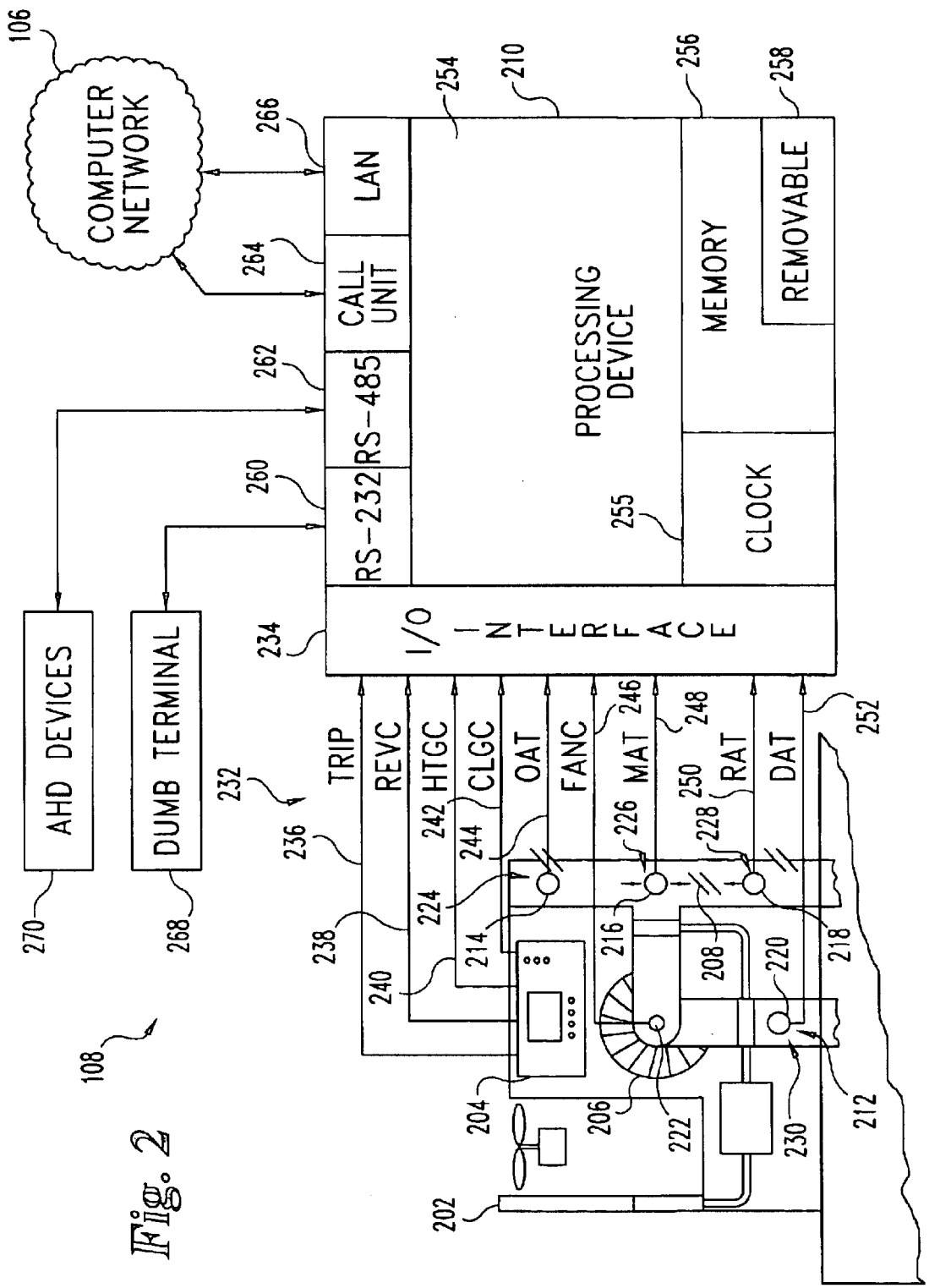
FIG. 2 shows a diagrammatic view of a diagnostic system in the FIG. 1 monitoring system.

An example of an equipment site 108 with an HVAC system 202 is depicted in FIG. 2. The HVAC system 202 includes components that are used to control air temperature and quality, such as an air conditioner/heat pumps, auxiliary heating units, chillers, fans, duct work, controls, sensors and dampers, to name a few. The HVAC system 202 includes a controller 204 that controls the various pieces of equipment in the HVAC system, such as blower fan 206 and dampers 208. A diagnostic system 210 according to the present invention is operatively coupled to the HVAC system 202 in order to monitor the operational status of the HVAC system 202. To observe the operational status of the HVAC system 202, the diagnostic system 210 has one or more sensors 212 attached to the HVAC system 202. In one embodiment, sensors 212 are installed in the HVAC system 202 by the service technician and are separate from the sensor(s) the HVAC system 202 uses to control its own operation. Sensors 212 include an outdoor air temperature (OAT) sensor 214, a mixed air temperature (MAT) sensor 216, a return air temperature (RAT) sensor 218, a discharge air temperature (DAT) sensor 220, and a fan control (FANC) sensor 222. By being positioned inside a make-up air area (or duct) 224 in the HVAC system 202, the OAT sensor 214 is able to monitor the temperature of the outside air supplied to the building. The outside air is mixed with return air from the building in mixed air area 226 (before the cooling/heating coils and fan, and after the economizer damper 208). To monitor the temperature of this mixed air, the MAT sensor 216 is positioned inside the mixed air area 226. RAT sensor 218 is placed in return air area 228 in order to monitor the temperature of the return air from the building. DAT sensor 220 is placed inside discharge area 230 so that the temperature of the air discharged from the HVAC system 202 is measured. FANC sensor 222 monitors the operation of blower fan 206. The controller 204 along with the sensors 212 are operatively coupled to the diagnostic system 210 through communication pathways 232. Information about the HVAC equipment 202 is supplied to the diagnostic system 210 through pathways 232. In one embodiment, pathways 232 are electrically conductive wires operatively coupled between the HVAC system 202 and the diagnostic system 210. As should be appreciated, HVAC system 202 can be operatively coupled to the diagnostic system 210 in other manners, such as through fiber optics and radio transmissions, to name a few.

The diagnostic system 210 includes an input/output (I/O) interface 234 for processing communications with the various communication pathways 232. TRIP pathway 236 supplies to the diagnostic system 210 any information about any internal errors that may have occurred in the controller 204 of the HVAC system 202. Reversing valve control (REVC) pathway 238 routes a signal from the controller 204 to the diagnostic system 210 to indicate the status of a reversing control valve that is used to control the heating and cooling in the HVAC system 202. For example, the reversing control valve can be actuated so that the HVAC 202 system can either act as a heat pump or as an air conditioner. Heating control (HTGC) communication pathway 240 routes a signal from the controller 204 to indicate if a supplementary heating coil in the HVAC system 202 is operating. Cooling control (CLGC) communication pathway 242 provides a signal from the controller 204 indicating whether a supplementary cooling system has been activated in the HVAC system 202. OAT sensor 214 is operatively coupled to the I/O interface 234 through OAT communication pathway 244. The diagnostic system 210 receives data from the FANC sensor 222 through FANC communication pathway 246. Further, the diagnostic system 210 receives mixed air temperature, return air temperature, and discharge air temperature data through MAT 248, RAT 250, and DAT 252 communication pathways, respectively.

As depicted in FIG. 2, the diagnostic system 210 includes a processing device (processor) 254, an internal clock 255 and memory 256. Processor 254 can be composed of one or more components of a digital and/or analog type. Processor 254 can be operable by software and/or firmware, a hard-wired state machine, programmable logic device, or a combination of these. Processor 254 may be comprised of one or more components configured as a single unit. For a multi-component form of processor 254, one or more components can be located remotely relative to the others. One or more components of the processor 254 may be of the electronic variety defining digital circuitry, analog circuitry, or both. Clock 255 can be incorporated into processor 254 and is operable to time various fucntions. Memory 256 can include one or more types of solid state electronic memory, magnetic memory, or optical memory, just to name a few. By way of non-limiting example, memory 256 can include solid state electronic random access memory (RAM), sequential access memory (SAM), such as first in, first out (FIFO) variety or the last in, first out (LIFO) variety, programmable readable memory (PROM), electronically programmable read only memory (EPROM), or electronically erasable programmable read readable memory (EEPROM); optical disk memories (such as a DVD or CD ROM); a magnetically encoded hard disk, floppy disk, tape, or cartridge; or a combination of these memory types. In addition, memory 256 may be volatile, non-volatile, or a hybrid combination of volatile, non volatile varieties. Memory 256 includes removable memory 258 that can be removed from the processing device 210. The diagnostic system 210 can include a personal computer, a programmable logic control unit (PLC), a personal digital assistant (PDA), and/or other types of devices generally known to those skilled in the art. In the illustrated embodiment, diagnostic system 210 is a personal computer. As illustrated, diagnostic system 210 includes an RS-232 port 260, an RS-485 port 262, a call unit 264, and a LAN interface card 266. The RS-232 port 260 is used for communicating with a terminal 268 that a technician can use to interface with the diagnostic system 210. The RS-485 port 262 is operatively coupled to other air handling devices 270. Call unit 264 is operatively coupled to the computer network 106 to provide an operative communication connection between the diagnostic system 210 and the monitoring facility 102. Call unit 264 can include communication devices, such as modems, network interface cards, and/or cable modems, to name a few. In one form, the call unit 264 is a modem that communicates with the monitoring facility through a public switched telephone network (PSTN). LAN card 266 allows the diagnostic system 210 to communicate with a LAN at the equipment site 108 and/or over the computer network 106.

Figure 3:
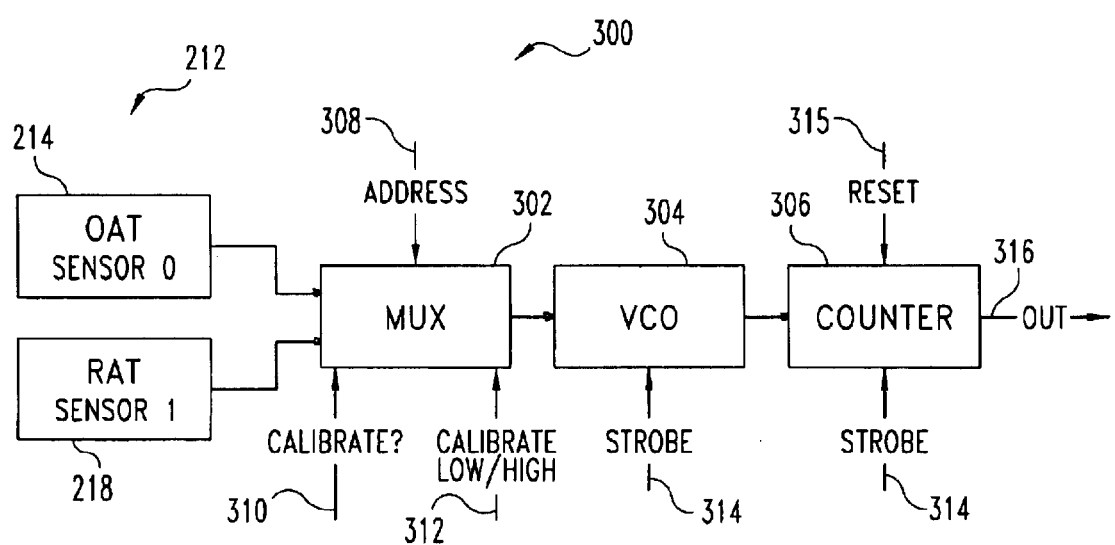
FIG. 3 shows a sensor system used in the FIG. 2 diagnostic system.

FIG. 3 illustrates a communication system 300 for the I/O interface 234 according to one embodiment of the present invention. In system 300, sensors 212 supply sensor data to the I/O interface 234. Only OAT sensor 214 and RAT sensor 218 are shown FIG. 3 to preserve clarity. The other sensor devices 212, such as DAT sensor 214, FANC sensor 222, and MAT sensor 216, are also operatively coupled to the diagnostic system 210 in a similar manner. As should be appreciated, other types of sensors can use interface 300.

As shown in FIG. 3, the OAT sensor 214 and the RAT sensor 218 are operatively coupled to a multiplexer (MUX) 302. A voltage-controlled oscillator (VCO) 304 is operatively coupled between the MUX 302 and a pulse counter 306. In one embodiment, the MUX 302 is an ADG 706 model CMOS 2.5 ohm low volt sixteen (16) channel analog multiplexer manufactured by Analog Devices, Inc., the VCO 304 is a 74LS628 model VCO manufactured by several vendors (including, Texas Instruments), and the counter 306 is a 74LS590 model eight-bit counter manufactured by several vendors (including, Texas Instruments). An address channel 308 controls the MUX 302 so as to select one of the sensors 212 to read. Calibration line 310 in the MUX 302 is used to receive a signal to initiate calibration. Calibration Low/High line 312 is used to select which calibration level to use. VCO 304 and counter 306 both receive inputs from a strobe channel 314. The counter 306 has a reset line 315 operatively coupled to the processor 254 for resetting the counter 306 and an output line 316 for sending an interrupt signal to the processor 254. In the illustrated embodiment, the OAT sensor 214 and the RAT sensor 218 are thermistors in a voltage divider biased into operating condition. In one form, each sensor 212 is biased with a five (5) volt power supply. As should be appreciated, other types of sensors that can provide a variable voltage corresponding to measurements can be used. For example, sensors 212 and/or corresponding signals can include, but are not limited to, thermistors, photoresistors, potentiometers, pressure transducers, thermocouples, IR sensors, acoustic sensors, piezoelectric sensors, appropriately divided and rectified twenty-four volt AC control signals, five-volt DC active sensors, and five-volt AC current transducers.

One technique for reading measurements from the sensors 212 will now be described with reference to FIGS. 4 and 5.

Figure 4:
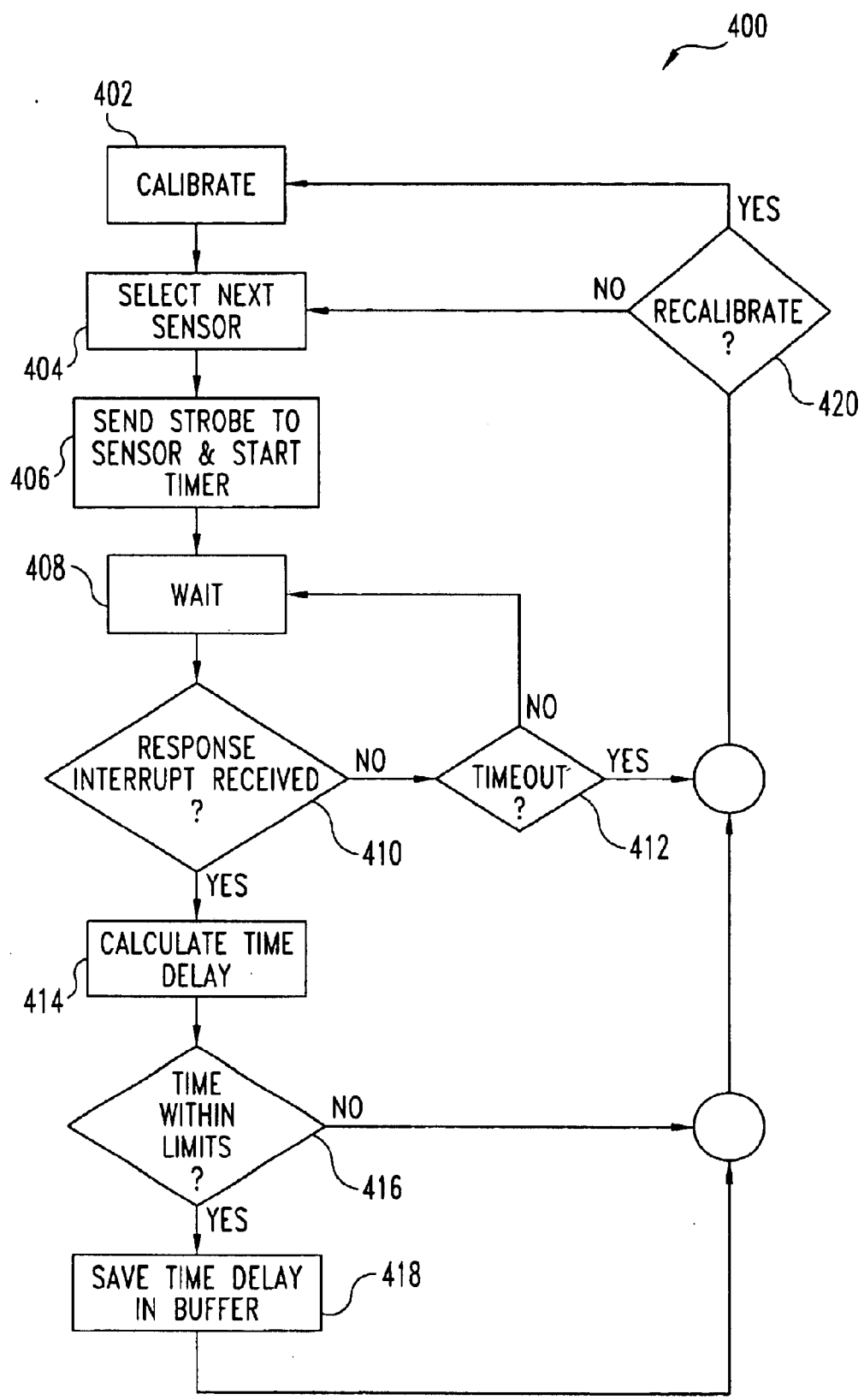
FIG. 4 is a flow diagram illustrating a technique for measuring sensor readings with the FIG. 2 diagnostic system.

FIG. 4 contains a flow chart 400 that illustrates the technique from the perspective of the processor 254. In stage 402, diagnostic system 210 calibrates the I/O interface 234. The calibration line 310 routes a calibrate signal to the MUX 302. In one form, the calibrate Low/High line 312 is first set to a low signal in which the MUX 302 sends a low voltage signal to the VCO 304. In one particular form, this low voltage signal is zero (0) volts. As should be understood, different voltage levels can be used to calibrate the I/O interface 234. At the same time, the processor 254 resets the counter 306 by sending a reset signal over reset line 315. Responding to the low calibration voltage, the VCO 302 produces an output frequency that is proportional to the low calibration voltage. The counter 306 counts the pulses produced and continues to count the pulses until a pulse limit is reached. In one embodiment, this pulse limit is 256 cycles (0–255). Once the pulse limit is reached, the counter 306 sends an interrupt signal to the processor 254. Through clock 255, the processor 254 is able to calculate the time delay between sending the calibration signal and receiving the interrupt signal, and this low calibration value time delay is stored in memory 256. Afterwards, the I/O interface 234 is calibrated for a high value by setting the Low/High line 312 to high. For example, in the calibration high mode, the I/O interface 234 is calibrated for a five (5) volt signal. The counter 306 sends and interrupt when the time delay limit is reached, and the processor 254 stores in the memory 256 the time delay for the high calibration value. As should be appreciated, the system 300 can be calibrated in a different order and/or additional calibration voltages between the high and low voltage values can be used for calibration.

After calibrating the I/O interface 234, the processor 254 in stage 404 selects one of the sensors 212 to obtain a reading. Address line 308 in the MUX 302 is used to select one of the sensors 212. In stage 404, the I/O interface 234 sends an address signal along address channel 308 to the MUX 302 in order to select a particular sensor 212. For example, sending a low signal on address line 308 selects OAT sensor 214, and sending a high signal selects RAT sensor 218. In stage 406, the processor 254 stores in memory 256 a start time from clock 255 and sends a strobe signal on strobe line 314 along with a reset signal on reset line 315. The processor 254 sends the strobe signal to the VCO 304 and counter 306. By sending the reset signal on reset line 315, the processor 254 resets the counter 306. Upon sensing the strobe signal, the VCO 304 starts generating pulses at a frequency proportional to the voltage from the selected sensor 212.

Figure 5:
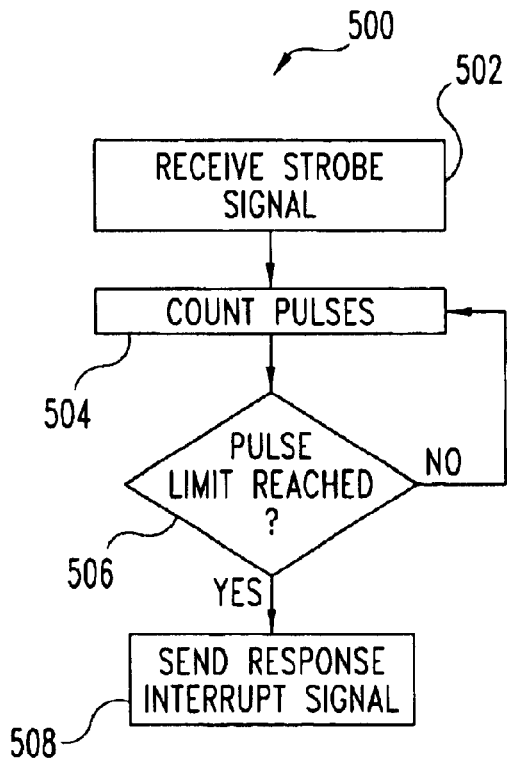
FIG. 5 shows a flow diagram further illustrating the FIG. 4 technique.

FIG. 5 further illustrates this technique from the perspective of the VCO 304 and the counter 306. As shown in FIG. 5 in stage 502, both the VCO 304 and the counter 306 receive the strobe signal from strobe channel 314. In response to the reset signal, the counter 306 resets to zero. After being energized with the strobe signal, the VCO 304 sends pulses to the counter 306 at a frequency proportional to the sensor voltage from MUX 302. For example, the OAT sensor 214 in one embodiment is a thermistor, and the address channel 308 selects to measure a voltage from OAT sensor 214 that is proportional to temperature. The VCO 304 oscillates at a frequency proportional to the voltage from the OAT sensor 214. In stage 504, the counter 306 counts the pulses from the VCO 304. The counter 306 continues to count the pulses until a pulse limit is reached in stage 506. In one embodiment, this pulse limit is 256 pulses (0–255). If in stage 506 the pulse limit has not been reached, the counter 306 continues to count pulses in stage 504. Alternatively, if the pulse limit is reached in stage 506, the counter 306 sends an interrupt signal on output line 316 to processing device 254. In one embodiment, the output line 316 is normally high and an interrupt is signaled by sending the output channel 316 to a low voltage.

In the meantime, the processor 254 in stage 408 has been waiting to receive an interrupt signal from the counter 306 on line 316. While waiting in stage 408, the processor 254 is free to perform other operations. In stage 410, system 210 checks to see if an interrupt signal has been received. In one form, once an interrupt is received, an interrupt handler redirects operation of the processor to a specific routine. When no interrupt signal is received, the processor 254 in stage 412 determines if a sensor timeout condition has occurred. When an interrupt signal is not received within a specified time limit, the processor 254 assumes that a sensor malfunction has occurred. When the sensor timeout occurs, no time delay value is stored in memory 256 for the particular sensor 212 and the processor proceeds to stage 420. Periodically, the processor 254 recalibrates the I/O interface 234. The processor 254 through the clock 255 checks to see if a recalibration timeout has occurred in stage 420. This recalibration timeout in one particular form occurs at one-minute time intervals. As should be appreciated, other time intervals can be used. If the recalibration timeout has occurred, the processor 254 in stage 402 recalibrates the I/O interface 234. Otherwise, another sensor 212 is selected to be measured in stage 404. In stage 412, when a sensor timeout does not occurred, the processor 254 returns to waiting in stage 408. In operation, when an interrupt is received, an interrupt handling function is triggered to interrupt the processor 254. Once the interrupt signal is received in stage 410, the processor 254 through clock 255 in stage 414 calculates the time delay between when the strobe signal was originally sent and when the interrupt signal was received. The processor 254 in stage 414 then compares the calculated time delay with the calibrated low and high time delay values that were previously stored in memory 256 (stage 402). If the calculated time delay is outside these calibration limits, it is assumed that a sensor error has occurred and the processor 254 proceeds to stage 420 without recording the time delay for the sensor 212 in memory 256. Otherwise, the calculated delay for the selected sensor 212 is stored in memory 256 in stage 418, and the processor 254 determines if recalibration is required in stage 420. When no recalibration is required, the next sensor 212 to be read is selected in stage 404. Once the last of the sensors 212 is read, the processor 254 cycles again to the first sensor in order to continue monitoring sensor readings.

Figure 7:
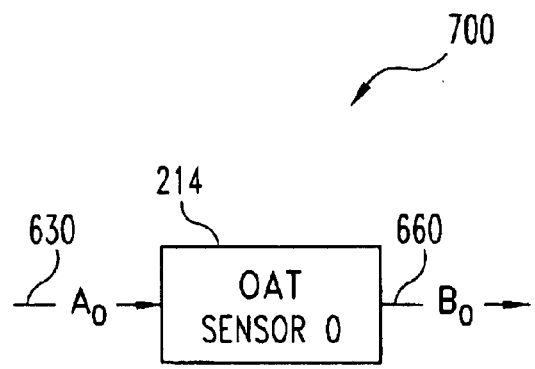
FIG. 7 shows a diagrammatic view of a sensor device assembly according to another embodiment of the present invention.
Figure 6:
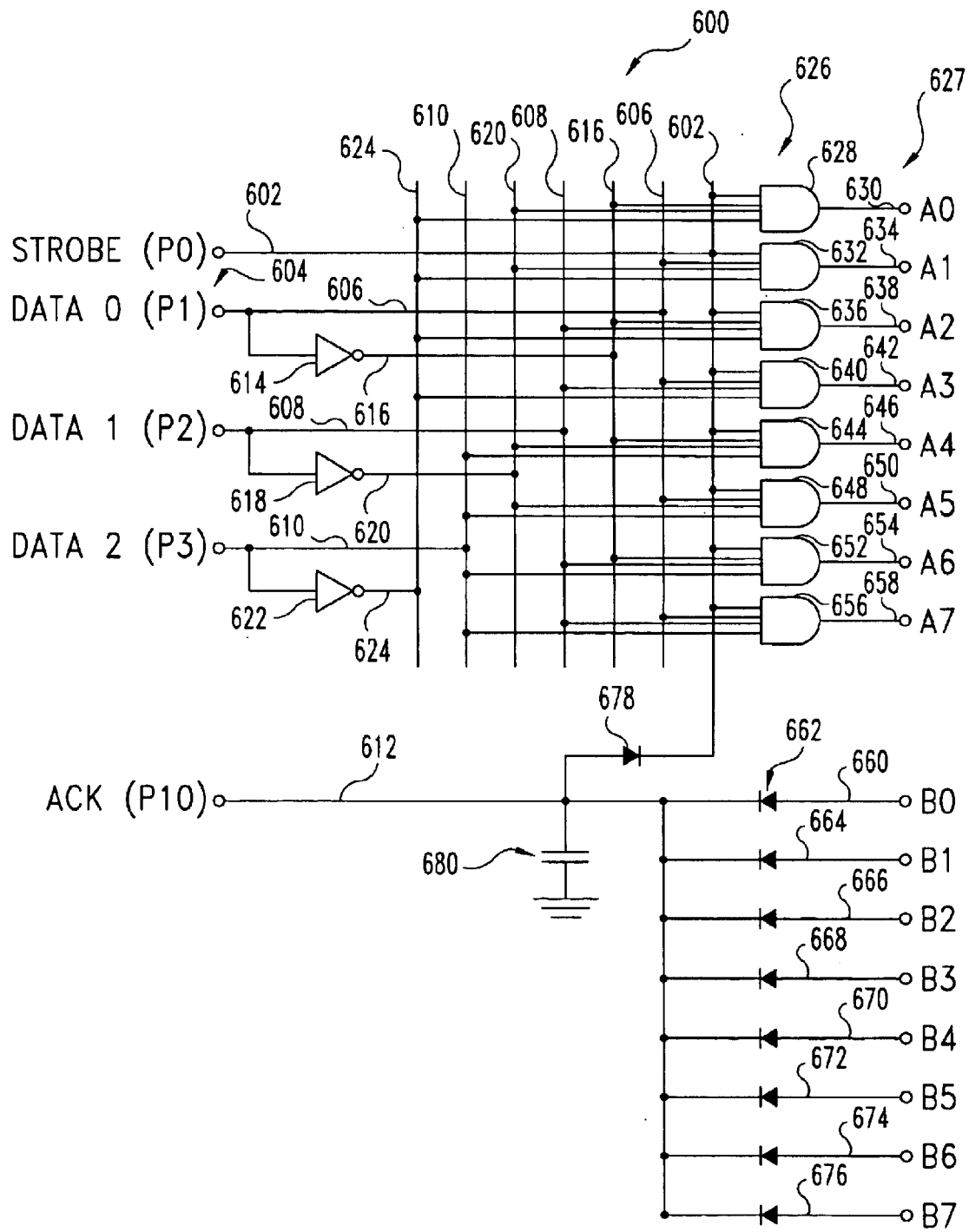
FIG. 6 shows a diagrammatic view of a sensor addressing system according to another embodiment of the present invention.

A communication system 600 for the I/O interface 234 according to another embodiment of the present invention is illustrated in FIGS. 6 and 7. In system 600 (FIG. 6), the I/O interface 234 is able to address a large number of sensors through use of a standard parallel port of a personal computer. The system 600 illustrated in FIG. 6 is an eight (8) channel version. Communication systems 600 with up to 2048 channels are possible on a single standard personal computer parallel port with eleven (11) output lines. The number of sensors 212 connected increases two-fold for each additional address line used. For example, using four (4) parallel ports with a total of thirty-two (32) lines permits access to over four-billion sensors. System 600 includes a strobe line (PO) 602; address lines 604 that include address line (Data 0) 606, address line (Data 1) 608, and address line (Data 2) 602; and an acknowledge line (Ack) 612 on which an interrupt signal is received. The address lines 604 are used to select the sensors 212 to read. An inverter 614 is operatively coupled to data line 606 and the output from which forms inverted data line 616. Similarly, address line 608 has an inverter 618 operatively coupled thereto in order to form inverted line 620. Inverter 622 is operatively coupled to data line 610 and the output from which forms inverted line 624.

System 600 further includes a plurality of four-input AND gates 626 that are operatively coupled to address lines 604 and strobe line 602. The AND gates 626 each have separate output lines 627 that are operatively coupled to separate sensors 212 in the manner as shown in FIG. 2. AND gate 628 receives input from strobe line 602, inverted line 616, inverted line 620, and inverted line 624. As mentioned above, a sensor device 212 is operatively coupled to output line 630 (A0) from AND gate 628. Strobe line 602, address line 606, inverted line 620, and inverted line 624 are operatively coupled to AND gate one 632. Output from AND gate 632 is sent along an output line (A1) 634. As depicted, AND gate 636 receives inputs from strobe line 602, inverted line 616, data line 608, and inverted line 624. The output from AND gate 636 is sent from sensor line (A2) 638. In system 600, strobe line 602, data line 606, data line 608, and inverted line 624 are operatively coupled as inputs to AND gate 640. Output from AND gate 640 is sent along output line (A3) 642. As shown, AND gate 644 receives inputs from strobe line 602, inverted line 616, inverted line 620, and data line 610. AND gate 644 has an output line (A4) 646. As illustrated in FIG. 6, AND gate 648 receives inputs from strobe line 602, data line 606, inverted line 620, and data line 610. The output from AND gate 648 is sent along data line (A5) 650. Moreover, AND gate 652 receives inputs from strobe line 602, inverted line 616, data line 608, and data address line 610. The output from AND gate 652 is sent along line (A6) 654. AND gate 656 receives inputs from strobe line 602, data line 606, data line 608, and data line 610. Output from AND gate 656 is sent along data line 658.

The output data lines 627 are respectively coupled to separate sensor devices 212. Output from these devices 212 are received on data lines 660, 664, 666, 668, 670, 672, 674 and 676, which are operatively coupled together at acknowledge line 612. Each of these lines includes a Zener diode 662 in order to isolate the individual sensors 212 from one another. Diode 678 is operatively coupled between the strobe line 602 and acknowledge line 612. A capacitor 680, which is operatively coupled between the acknowledge line 612 and ground, and with an addressed sensor 212 cooperate to cause a delayed rise in voltage on line 612. The address data lines 604 select the sensor 212 to read. In operation, the data lines 604 address the particular device and strobe line 602 is energized in order to energize one of the data lines 627. As shown in FIG. 7, an example of a sensor device assembly 700 according to this embodiment is illustrated. It should be appreciated that only one sensor device assembly 700 is shown for the sake of clarity and that the other sensors 212 can be operatively coupled to system 600 in a similar fashion. In sensor device assembly 700, output line 630 is operatively coupled to the OAT sensor 214. The OAT sensor 214 in this embodiment is a voltage divider with a thermistor. The output voltage from the OAT sensor 214 is sent along output line 660.

System 600 can selectively address and energize the sensors 212. For example, when all of the data lines 604 are low and a strobe signal 602 is sent along line 602, the strobe signal energizes the OAT sensor 214. The resistance across the OAT sensor 214 along with the capacitor 680 cause a delayed rise in voltage on acknowledge line 612. The processor 254 senses an interrupt signal on acknowledge line 612 when the voltage on line 612 reaches a specified threshold, such as five volts. Once an interrupt is sensed, the processor 254 lowers the strobe signal on strobe line 602. The processor 254 calculates the delay time between the strobe and interrupt signals according the technique described above with reference to flow chart 400 in FIG. 4, and the calculated time delay is stored in memory 256.

The technique described above in FIG. 4 for monitoring sensors can be applied to other situations. In another embodiment, such sensing technique is used to monitor pump motors for cooling systems of nuclear reactors. Sensor signals in this particular arrangement come standard with a four to twenty (4–20) milliamp range as compared to the zero to five voltage range in the HVAC system 202 described above. To measure in this range, a 250-ohm resistor is placed across each of the input lines for the sensors. Other techniques also may be used to convert the four to twenty (4–20) milliamp range to zero to five (0–5) volt or one to five (1–5) volt range. Due to the potentially catostrophic results of a cooling pump failure, sensor readings for such pumps are collected in one-second time intervals. As should be appreciated, the sensor collection time intervals can vary depending on the nature of the system sensed.

Figure 8A:
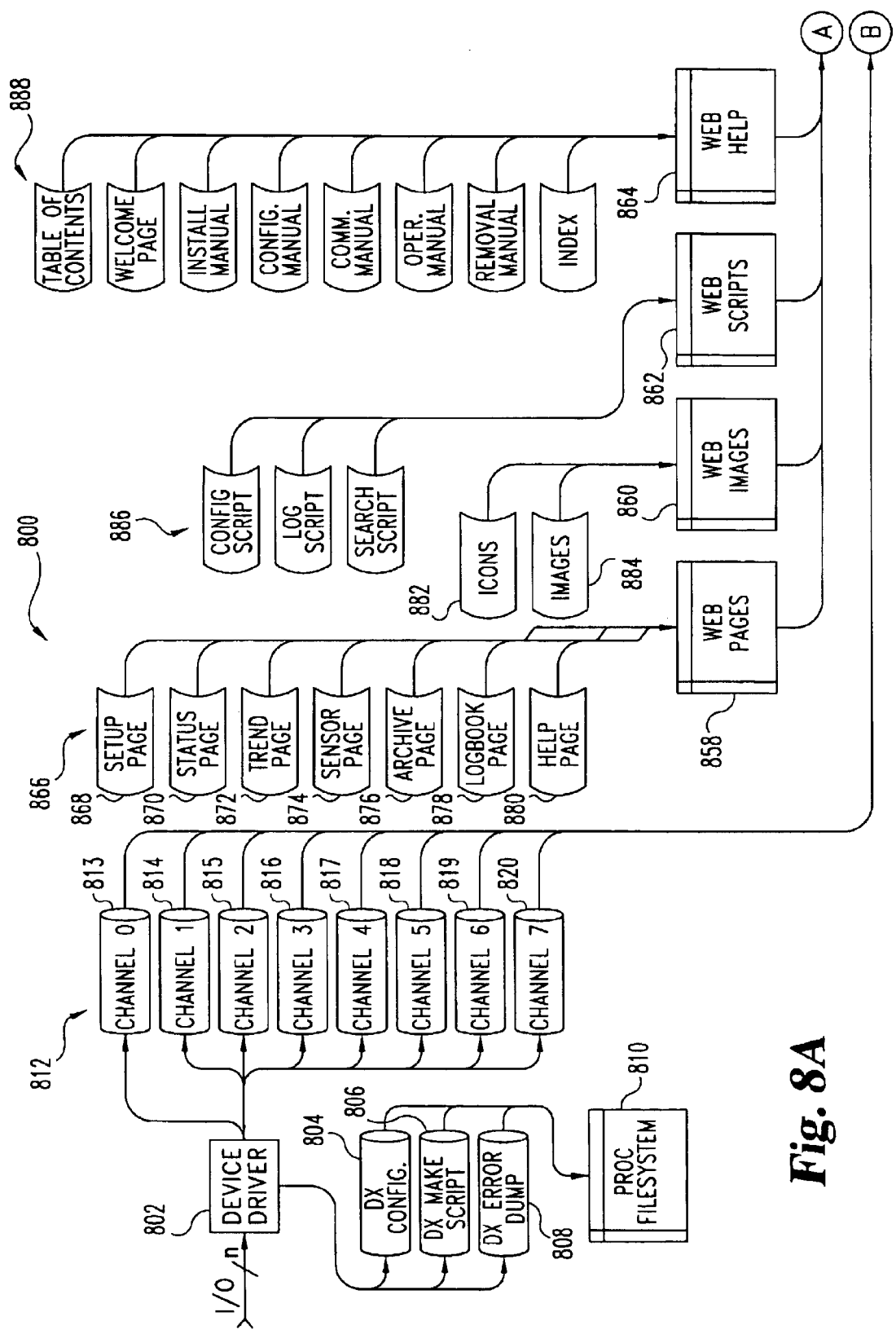
FIGS. 8A–B show a diagrammatic system overview of subsystems in the diagnostic system of FIG. 2.
Figure 8B:
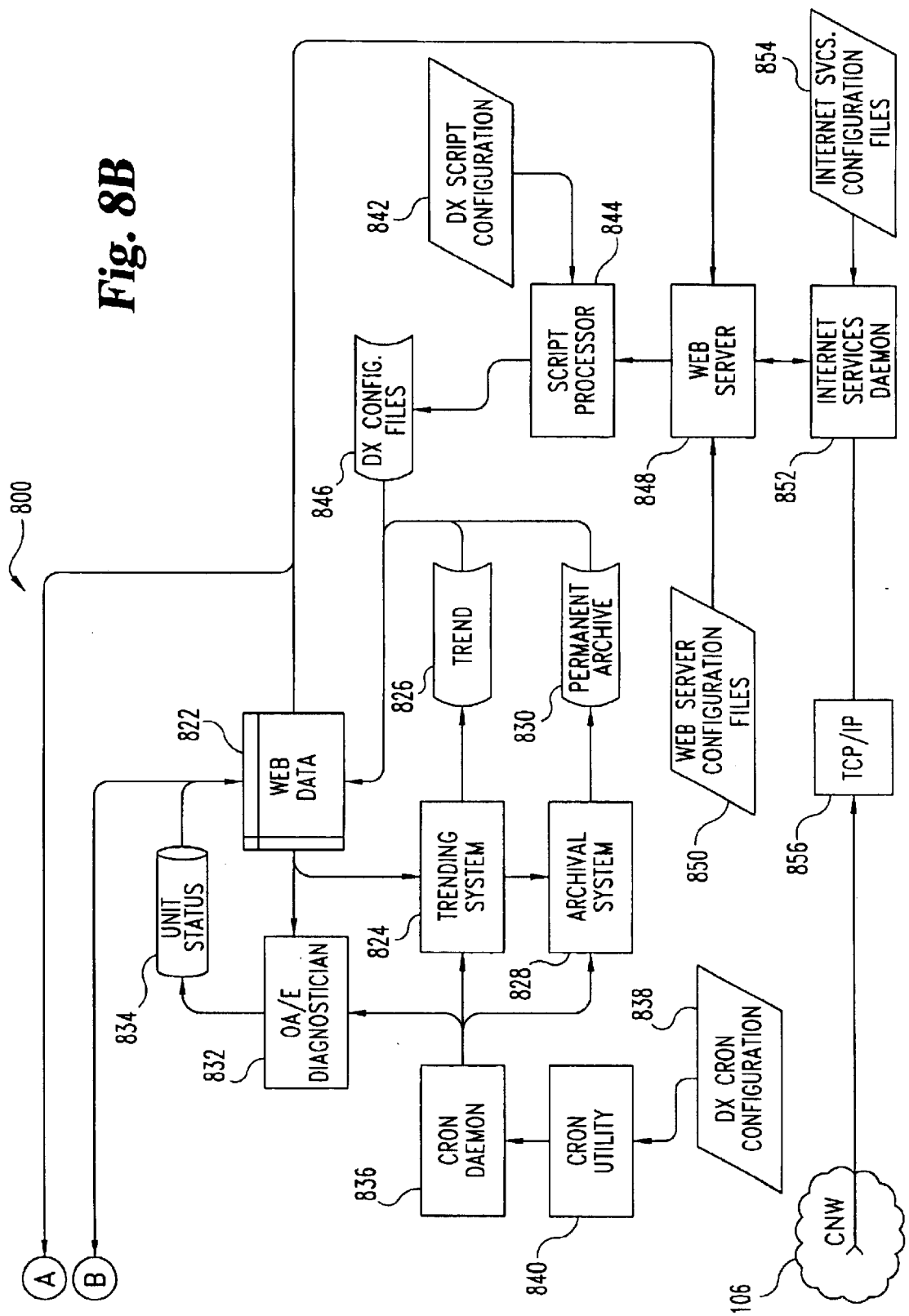

FIGS. 8A–B illustrate a representation of a data system 800 according to one embodiment of the present invention. In FIGS. 8A–B, system 800 represents various software components (routines) and the various files stored in memory 256 through which the processor 254 processes the data from the HVAC system 202. It should be understood that certain software components and/or files can be added, omitted and/or structured differently from the system 800 shown in FIG. 8. The software components in the illustrated embodiment are written in C programming language. As should be appreciated, these software components can be written in other programming languages, such as Java, Basic, Fortran, Pascal, and/or an applicable assembly language to name a few. In one form, diagnostic system 210 is running a Lunix operating system. As should be appreciated, other operating systems, such as Unix, Macintosh and Windows, can be used. As illustrated in FIG. 8A, a device driver 802 is used to receive and process the information from the I/O interface 234. Device configuration file 804, device script file 806, device driver error and device error dump file 808 are stored in processes (proc) file system directory 810 in order to configure device driver 802 when diagnostic system 210 is started. Device driver 802 interfaces with the sensors 212 and generates the measured time delay values stored in memory 256 in accordance with the technique described above with reference to FIGS. 4–5.

When another software component in system 800 requests a sensor reading, the device driver 802 retrieves the time delay sensors readings from memory 256 and converts the time delays to an actual reading, such as a temperature, voltage, current, distance, etc. The device driver 802 places the converted readings into character special pseudo-device files 812. As should be appreciated, these pseudo-device files are not actual files per se. Rather, when the operating system receives a request for a particular file, device driver 802 generates and transfers to a particular location in memory 256 the requested sensor data so as to be retrieved by the requesting software component. The data stored in the particular memory location appears to the requesting software component that such a "file" is stored in memory 256.

Before the readings are sent, the device driver 802 normalizes the time delay information in memory 256 from the sensors 212 to range on a scale from 0 to 1, and then converts the normalized data to readings. Equation 1, below, shows how the time delay values are normalized according to one embodiment.

$$\text{Normalized Value} = (\text{Delay} - \text{Low } Cal.)/(\text{High } Cal. - \text{Low } Cal.) \quad (1)$$

As shown, the normalized reading is based on the calibrated high and low readings from stage 402. After the time delays are normalized, the normalized time delay values are converted to sensor readings. Equation 2 below shows a polynomial equation used to convert the normalized time delay values (value) to a sensor reading for a YSI 44002 Thermistor Temperature Sensor (Yellow Springs, Inc.). Equation 3, which is shown below, converts the normalized time delays to sensor readings for a YSI 44005 Thermistor Temperature Sensor. Conversion equations for other types of sensors can be created based on linear regression analysis by comparing time delays to specific measured values. These equations can vary based on the specific characteristics of the data collection system.

$$\begin{aligned}\text{Sensor Reading} \\ \text{YSI 44002}\end{aligned} = 2222.6581 - 504.44169 \times value + \quad (2)$$
$$51.572632 \times value^2 - 2.9398314 \times$$
$$value^3 + 0.099736263 \times value^4 -$$
$$0.002007175 \times value^5 + 2.21574 \times$$
$$10^{-5} \times value^6 - 1.03508 \times 10^{-7} \times value^7$$

$$\begin{aligned}\text{Sensor Reading} \\ \text{YSI 44005}\end{aligned} = 70.89188173 - 626.31320278 \times value + \quad (3)$$
$$3952.513159 \times value^2 - 16733.05862 \times$$
$$value^3 + 42423.82688 \times value^4 -$$
$$62410.07287 \times value^5 + 48919.3399 \times$$
$$value^6 - 15781.3068 \times value^7$$

After the time delay values are converted to readings, the device driver 802 calculates statistical information about the sensor readings, such as the mean and standard deviation. When a software component requests sensor readings, the device driver 802 outputs the readings along with the statistical information as pseudo-device files (channels) 812. By having these various channels 812 as character special pseudo-device files, information in the channels 812 can be easily ported to other applications. In the illustrated embodiment, these channels 812 are formatted in the extensible mark-up language (XML) such that particular information is "tagged". Table 1, which is shown below, provides an example of how such data can be formatted within XML. The objects in Table 1 can be stored in a single XML file and/or in separate XML files. In one embodiment, sensor information is stored in the various channels 812 based on the sensor object type, and trending information is stored using the trend object type (in trend log 826). Error and log information are respectively stored using the error and log object types. In this embodiment, diagnostic information is stored in memory 256 (unit status file 834) using the diagnosis object type of Table 1.

TABLE 1

| Object Type | Part | Subpart | Description |
| --- | --- | --- | --- |
| Sensor | All Sensor values resented | | |
| | Token | | Sensor name |
| | Value | | Sensor reading as a median of the samples collected. |

TABLE 1-continued

| Object Type | Part | Subpart | Description |
| --- | --- | --- | --- |
| | Attributes | | Sensor information. |
| | | Status | Sensor status: 0 = void, 1 = valid, 2 = invalid. |
| | | Unit | Sensor reading units (e.g., "F", "kWh", "%") |
| | | Stdev | Sensor reading standard deviation. |
| | | Slope | Sensor reading slope (e.g., F/s, kWh/s, %/s) |
| | | Skew | Sensor reading skew (expressed as a fraction of high stdev to low stdev, e.g., >1 is high stdev > low stdev) |
| | | Samples | Number of samples used to calculate the average, stdev, skew, min, and max. |
| | | Min | The minimum reading seen. |
| | | Max | The maximum reading seen. |
| | | Mean | The average of samples collected. |
| | | Span | Time in seconds between when first and last samples were collected. |
| | | Age | Time in seconds since last sample was collected. |
| | | Msg | A test message corresponds to a diagnosis of the sensor's status. |
| Trend | Token | | Trend Indicates trend log follows. |
| | Value | | Log Log entry embedded (repeated many times). |
| | Attributes | | (None) |
| Log | Token | | Log Indicates log entry follows. |
| | Value | | Date Date of log entry. |
| | | | Time Time of log entry. |
| | | | (Varies) Various values known at date/time of log entry. |
| Error | Token | | Log Indicates trip/error message follows. |
| | Value | | (Text) Message indicating nature of trip/error. |
| | Attributes | | Date Date of message. |
| | | | Time Time of message. |
| Diagnosis | Token | | State System state entry follows. |
| | Value | | (test) Message describing state. |
| | Attributes | | Status Indicates whether the state is valid, invalid or unknown. |
| | | | Code Indicates the status code number. |

As can be seen above, the sensor can be subdivided into its sensor name (token), the average reading from the samples collected (value), and particular attributes. These attributes include the sensor status, the units being measured (unit), standard deviation of sensor readings (stdev), the reading slope (slope), a skew in the sensor readings (skew), the number of samples to calculate the average value (samples), the minimum reading (min), the maximum reading (max), the mean (mean), the time span between samples (span), the age of the last sample (age) and a text message corresponding to diagnosis of the sensor's status (msg). In one embodiment, the standard deviation, mean value and the other statistical values are calculated for the last sixty-four measurements. It should be appreciated, however, that other sample sizes can be used to calculate these statistics. Each of the channels 812 shown in FIGS. 8A–B represent the pseudo-device files for the individual sensor readings. In one embodiment, channel 813, channel 814, channel 815, channel 816, channel 817, channel 818, channel 819, and channel 820, respectively, represent sensor readings for OAT sensor 214, RAT sensor 218, MAT sensor 216, DAT sensor 220, FANC sensor 222, CLGC line 242, HTGC line 240, and REVC line 238. As should be appreciated, certain channels 812 can be omitted and other types of sensor readings can be contained in these channel files 812.

As illustrated in FIG. 8B, the web data directory 822 is structured by the operating system to appear to include the channels 812. Trending system 824 collects the sensor information from the channels 812, which are located in the web data directory 822, and develops a trend of the data at one-minute intervals for the most recent fifteen minutes. This trend data is stored as a trend log 826 in the web data directory 822. In one form, the trend data is stored in an XML file format (see Table 1 for an example). An archival system 828 periodically collects sample trending data from the trending system 824 for permanent storage in permanent archive 830, which is also stored within the web directory 822. In one form, the archive file 830 is formatted as a comma-separated value file within the web data directory 822. It should be appreciated that the permanent archive can be stored in other formats, such as an XML, HTML, or in database file format. Outdoor Air/Economizer (OA/E) Diagnostician 832 periodically determines if the HVAC system 202 is properly running by reviewing the readings in channels 812. The diagnostician 832 stores the current status of the HVAC system 202 in unit status file 834, which is located in the web data directory 822. In one form, the unit status data is stored in an XML file format (see Table 1 for one example). As should be understood, the unit status file 834 can be formatted differently.

In order to schedule periodic operation of the subsystems 824, 828 and 832, system 800 has an operating system that utilizes a cron daemon 836. When the system 800 is started (booted), DX cron-configuration file 838 modifies the cron utility file (crontab) in order to designate when to periodically run the trending system 824, archival system 828, and diagnostician 832. The cron daemon 836 periodically runs the systems 824, 828 and 832 based on the time periods specified in the cron utility file 840. As should be appreciated, depending on the operating system used, different scheduling utilities can be used to schedule these subsystems. In one embodiment, the diagnostician 832 runs every minute, the trending system 824 runs every minute and the archival system runs every fifteen-minutes. In another embodiment, the diagnostician 832 runs every second. As should be appreciated, these subsystems can run at different time intervals than those described herein.

DX script configuration 842 is used by script processor 844 to generate configuration files 846 that are used by the diagnostician 832 for determining whether or not the HVAC system 202 is operating properly. In one embodiment, the DX configuration files 846 include an economizer type file (ECONTYPE) that specifies if and what type of economizer is being used in the HVAC system 202. Economizers are used by HVAC systems to reduce the amount of energy required to heat or cool a building by mixing outside air with return air in order to adjust the discharge air temperature. In a "high-limit" type economizer, the economizer is disabled so that outdoor air is not drawn into the building when the temperature exceeds a specified high temperature limit. With this type of economizer, DX configuration files 846 include a high limit file that specifies the high temperature limit. For example, the HVAC system 202 may not take in any outside air when the temperature is above 75° F. In a "differential" type economizer, the economizer is disabled when the difference between the outside and inside temperature comes within a specified differential limit. For both the high-low and differential type economizers, a "deadband" tolerance is used for comparing outdoor air and return air temperatures. The DX configuration files 846 for a differential type economizer can include files that specify differential parameters, such as the dead-band temperature. In one embodiment, the differential temperature is 5° F. For both economizer types, other temperature ranges may be used. An occupied basis file (OCCBASIS), which indicates how building occupancy is determined, can also be one of the DX configuration files 846. DX configuration files 846 can also include a minimum (MINOAF), required (REQOAF) and maximum (MAXOAF) outdoor air fraction files that specify the proportion of outdoor that the HVAC system 202 can use. The outdoor air fraction (OAF) is the proportion of outside air that is mixed with the indoor air.

The diagnostician 832 uses the information contained in the DX configuration files 846 along with the sensor information from channels 812 to determine the operational status of the HVAC system 202. The diagnostician 832 retrieves the sensor data in channels 812 by sending a request for these "files" to the operating system. The operating routes this request to the device driver 802 which in turn generates the pseudo-device files 812 that responds to this request. The diagnostician 832 then analyzes the sensor data and stores in memory 256 the status of the HVAC system 202 in unit status file 834. Below in Table 2 are examples of condition status code numbers along with corresponding descriptions of the conditions. As should be appreciated, other types of status indicators and/or descriptions can be used to indicate the status of the HVAC system 202.

TABLE 2

Conditions Detected

| Condition # | Description |
| --- | --- |
| Diagnostician failure | |
| −1 | Internal diagnostician error |
| Operation ok | |
| 0 | Zero outdoor-air ventilation is OK when the building is unoccupied |
| 1 | Outdoor-air ventilation is OK |
| 5 | Outdoor-air ventilation and economizer operation are OK |
| Incomplete diagnosis | |
| 19 | Outdoor-air ventilation is OK, but cannot verify economizer operation |
| 70 | Unable to check outdoor air because fan status signal is missing |
| 71 | Outdoor-air ventilation as required, but unable to determine heating or cooling mode |
| 72 | Return, mixed, or outdoor air temperature sensor failure |
| 73 | Return, mixed, or outdoor air temperature signal lost |
| 89 | Unable to verify economizer operation because required outdoor air supply cannot be compared to required (which may be missing) |
| 92 | Unable to determine outdoor air supply because outdoor air temperature is too close to return air temperature |
| Low ventilation problems | |
| 100 | No outdoor-air ventilation is being supplied |
| 130 | Inadequate outdoor-air ventilation is being supplied |
| Low economizer problem | |
| 200 | The economizer should be operating, but instead it is off |
| 250 | The economizer should be operating fully open, but it is only partially open |
| High ventilation problem | |
| 300 | Too much outdoor-air ventilation is being provided during the heating mode |
| 310 | Too much outdoor-air ventilation is being provided during the cooling mode |

TABLE 2-continued

Conditions Detected

| Condition # | Description |
| --- | --- |
| 325 | Too much outdoor-air ventilation is being provided during the floating (not heating or cooling) mode |
| 330 | Too much outdoor-air ventilation is being provided |

Control or other problems

| | |
| --- | --- |
| 580 | Outdoor-air ventilation is less than the minimum |
| 585 | Outdoor-air ventilation is greater than the maximum |

Control or other problems that waste energy

| | |
| --- | --- |
| 650 | This air handler's heating and cooling are on simultaneously |

Figure 9:
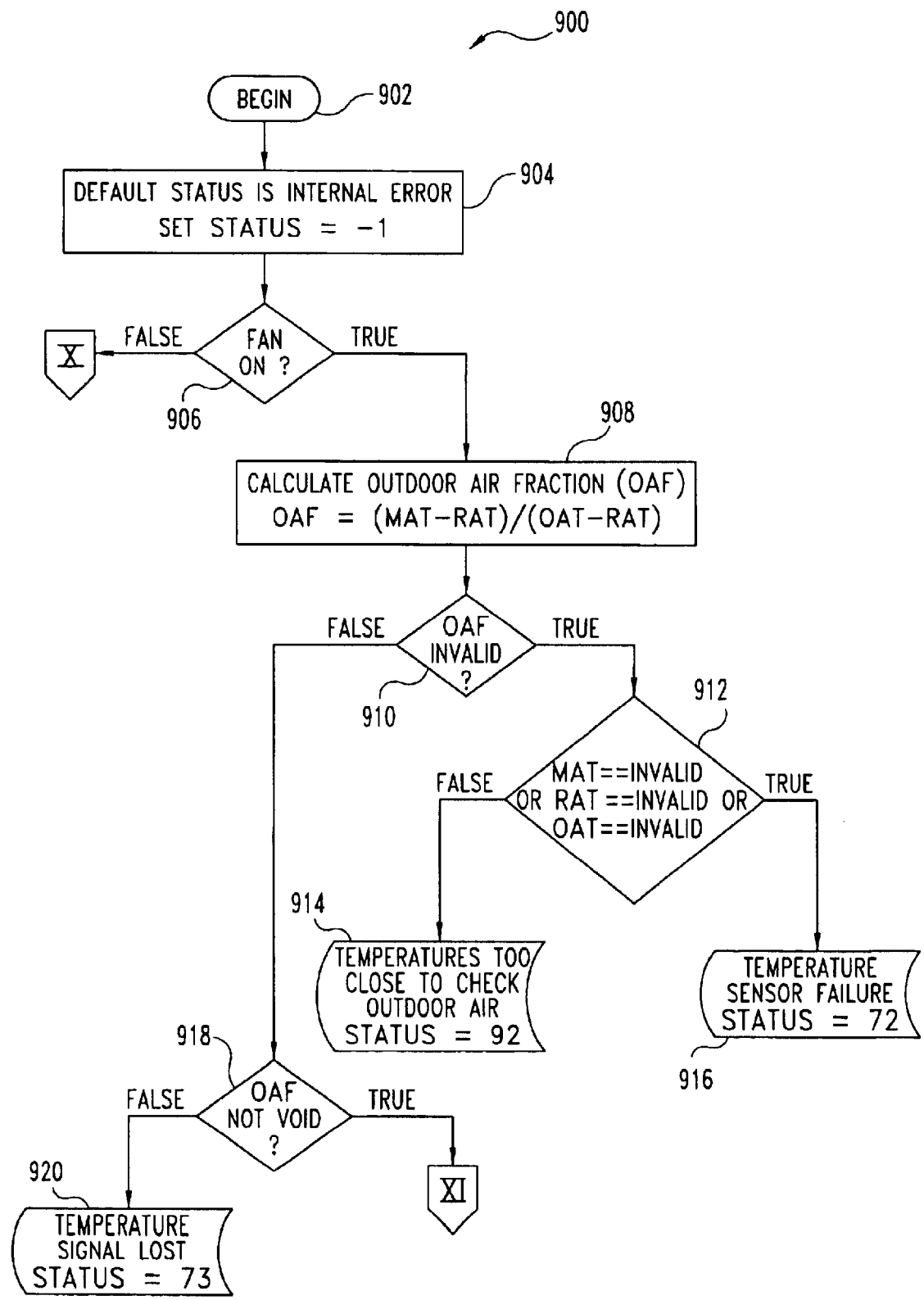
FIGS. 9–13 and 16–19 show a flow diagram illustrating one technique for diagnosing the operational status of a HVAC system.
Figure 10:
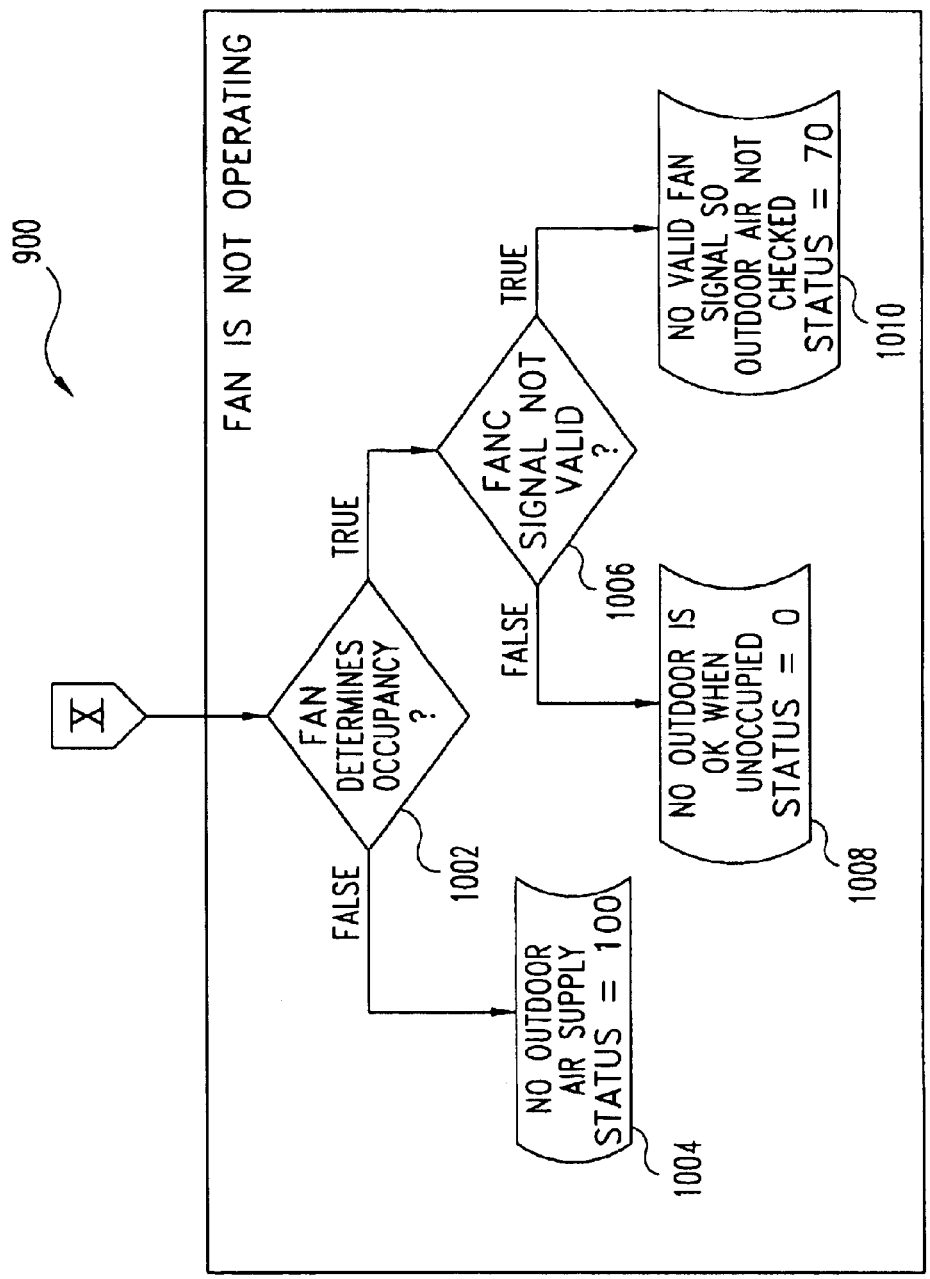

A technique the diagnostician 832 uses for determining the operational status of the HVAC system 202 will now be described with reference to FIGS. 9–19. A flow diagram 900 beginning in FIG. 9 illustrates this technique the processor 254 uses for diagnosing the operational status of the HVAC system 202. The status numbers (codes), which are shown in flow chart 900, are shown for explanation purposes only, and it is not the intent that the present invention be limited to the specific status codes displayed therein. As should be appreciated, the flow chart 900 can be modified to include additional subroutines and/or exclude certain illustrated subroutines for determining the operational status of the HVAC system 202. After beginning (stage 902), a default conditional status of the HVAC system 202 is set to an internal error status=−1. This ensures that if an interruption and/or error occurs in the processor 254 during the illustrated technique, an internal error status indicator for the diagnostician 832 will be stored in unit status file 834. In stage 906, the diagnostician 832 determines through channel four (FANC) 817 if the fan 206 is operating. If the fan 206 is not operating, then the diagnostician in stage 1002 determines if fan operation is used as a basis for determining building occupancy (FIG. 10).

The diagnostician 832 can determine building occupancy in a number of ways. One way, among others, is to check fan 206 operation. When the fan 206 is operating, the diagnostician 832 assumes the building occupied, and the diagnostician 832 assumes the building is unoccupied when the fan is not operating. Another way to check occupancy, is through maintenance of a building occupancy schedule in memory 256. The diagnostician 832 can check this schedule in order to determine if the building is occupied. To determine the manner in which occupancy is resolved, such as through fan operation or occupancy schedule, the diagnostician 832 in stage 1002 retrieves the occupied basis information from the DX configuration files 846. As previously mentioned, the DX configuration files 846 includes a building occupied basis file (OCCBASIS) that indicates how to determine occupancy. For example, the OCCBASIS file can contain a flag that equals zero (0) to indicate that fan operation is used to determine occupancy and that equals one (1) to indicate that the occupancy scheduling should be used. In the illustrated embodiment, fan operation is used to determine occupancy. In stage 1002, the diagnostician 832 determines if fan operation is used as a basis for determining occupancy (OCCBASIS=0). When fan operation is not used as a basis, in stage 1004, the diagnostician 832 returns a no outdoor air supply status error (status=100) and stores this status in unit status file 834. It should be appreciated that stage 1004 can be expanded to include additional stages for determining building occupancy in other manners, such as through occupancy scheduling. In stage 1006, when fan operation is used as a basis to determine building occupancy, the diagnostician 832 determines whether the fan control signal received from the FANC sensor 222 is valid or not. When the building is unoccupied, the fan 206 does not operate and no outdoor air needs to be supplied to the building. When the signal from the FANC sensor 222 is valid, the diagnostician 832 stores in unit status file 834 a status indicating that no outdoor air is acceptable when the building is unoccupied (status=0) in stage 1008. Otherwise, if the signal from the fan control sensor 222 is not valid (i.e., the sensor is damaged), then a non-valid fan signal status (status=70) is stored in the unit status file 834 in stage 1010.

Referring again to stage 906 in FIG. 9, if the fan 206 is on, then the diagnostician 832 calculates the outdoor air fraction (OAF). In one embodiment, as shown in equation 4 below, the outdoor air fraction is based on the mixed air temperature (MAT), the return air temperature (RAT), and the outdoor air temperature (OAT).

$$OAF = \frac{(MAT - RAT)}{(OAT - RAT)} \qquad (4)$$

By having the device driver 802 generate the channels 812, the diagnostician 832 is able to retrieve the mixed air temperature from the MAT sensor 216, the return air temperature from the RAT sensor 218, and the outdoor air temperature from the OAT sensor 214. If the calculated OAF in stage 910 is invalid, then the diagnostician 832 determines whether the MAT, RAT or OAT is invalid in stage 912. When the MAT, RAT and OAT values are valid, the diagnostician 832 changes the unit status file 834 to indicate that the temperatures are too close to check the outdoor air (status=92) in stage 914. Otherwise, if any of the temperature readings in stage 912 are invalid, a temperature sensor failure status (status=72) is recorded in unit status file 834 in stage 916. In stage 910, when the diagnostician 832 determines that the OAF is a valid value, the diagnostician 832 in stage 918 determines whether the OAF value is not void. If the calculated OAF value is void, the diagnostician 832 in stage 920 stores a "temperature signal lost" code (status=73) in the unit status file 834.

Figure 11:
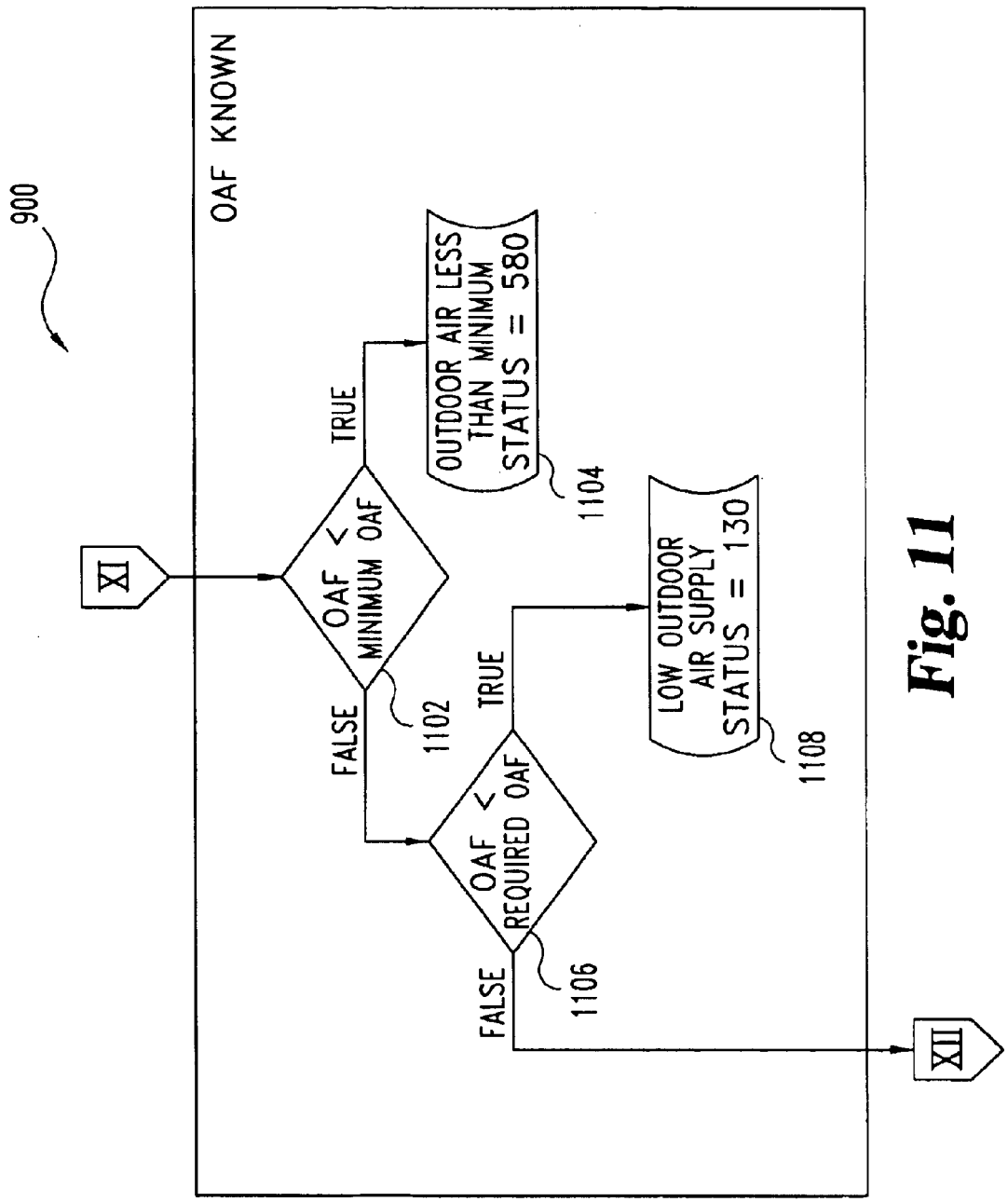

As depicted in FIG. 11, if the calculated OAF value is not void, then the diagnostician 832 in stage 1102 determines whether the OAF is less than the minimum OAF, which is stored in the DX configuration files 846. When the OAF is less than the minimum OAF, the diagnostician 832 records in unit status file 834 that the outdoor air ventilation is less than the minimum limit (status=580) in stage 1104. When the processor 254 through diagnostician 832 determines that the OAF is not less than the minimum OAF, then the processor 254 in stage 1106 determines whether the OAF is less than the required OAF for the equipment site 108. The diagnostician 832 obtains this required OAF information from the DX configuration files 846. When the OAF is less than the required OAF, the diagnostician 832 reports in the unit status file 834 that there is a low outdoor air supply in stage 1108 (status=130).

Figure 12:
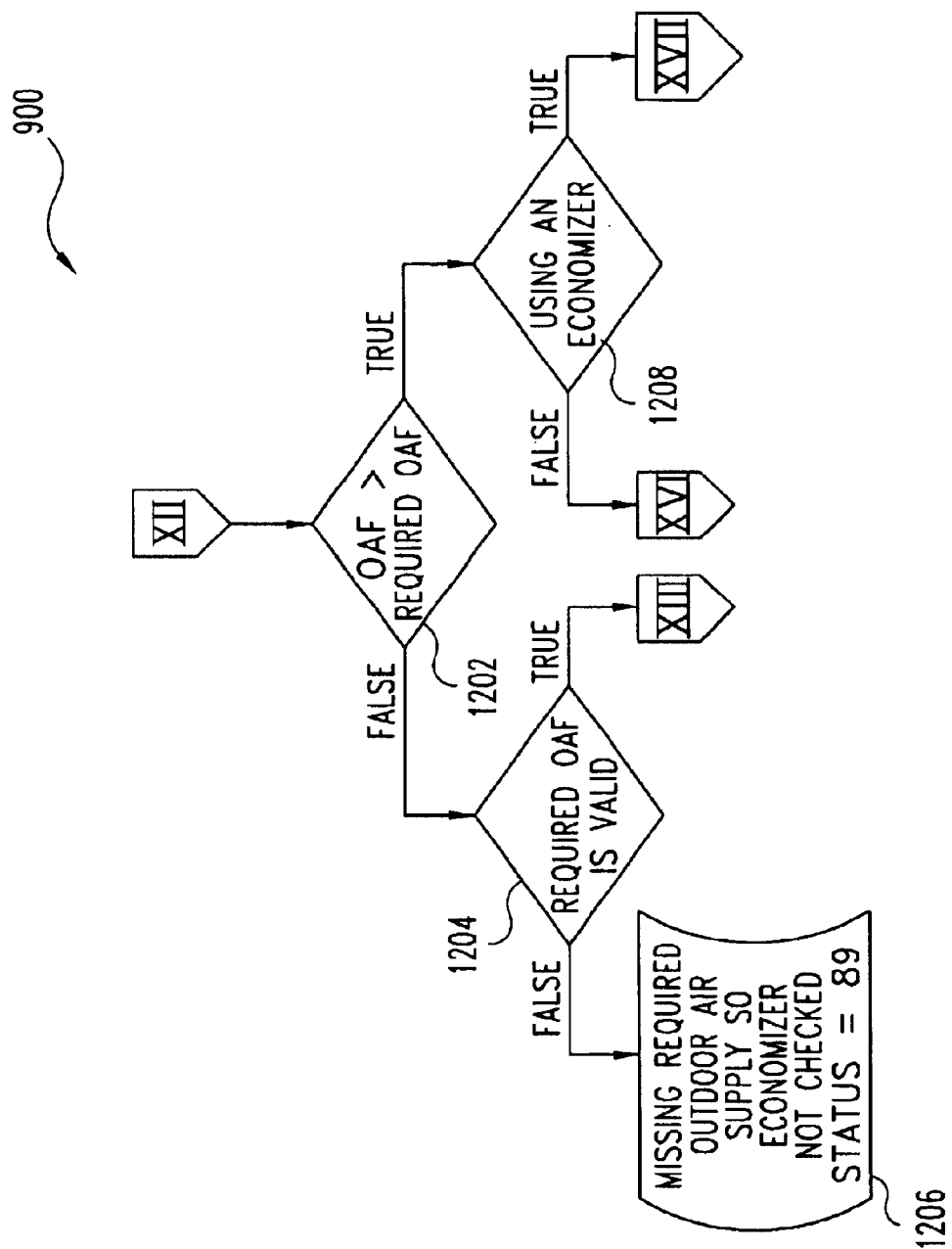

In FIG. 12, when the OAF is not less than the required OAF, the processor 254 through diagnostician 832 then determines if the calculated OAF value is greater than the required OAF in stage 1202. When the OAF is not greater than the required OAF, in stage 1204 the diagnostician 832 determines whether the required OAF is a valid number. The required OAF value may be invalid for a number of reasons. For example, the required OAF may be invalid due to data corruption in the DX configuration files 834 or due to the required OAF not being entered. If the required OAF is invalid, then the diagnostician 832 reports in stage 1206 that the required outdoor air supply (required OAF) is missing and therefore the economizer was not checked (status=89).

Figure 13:
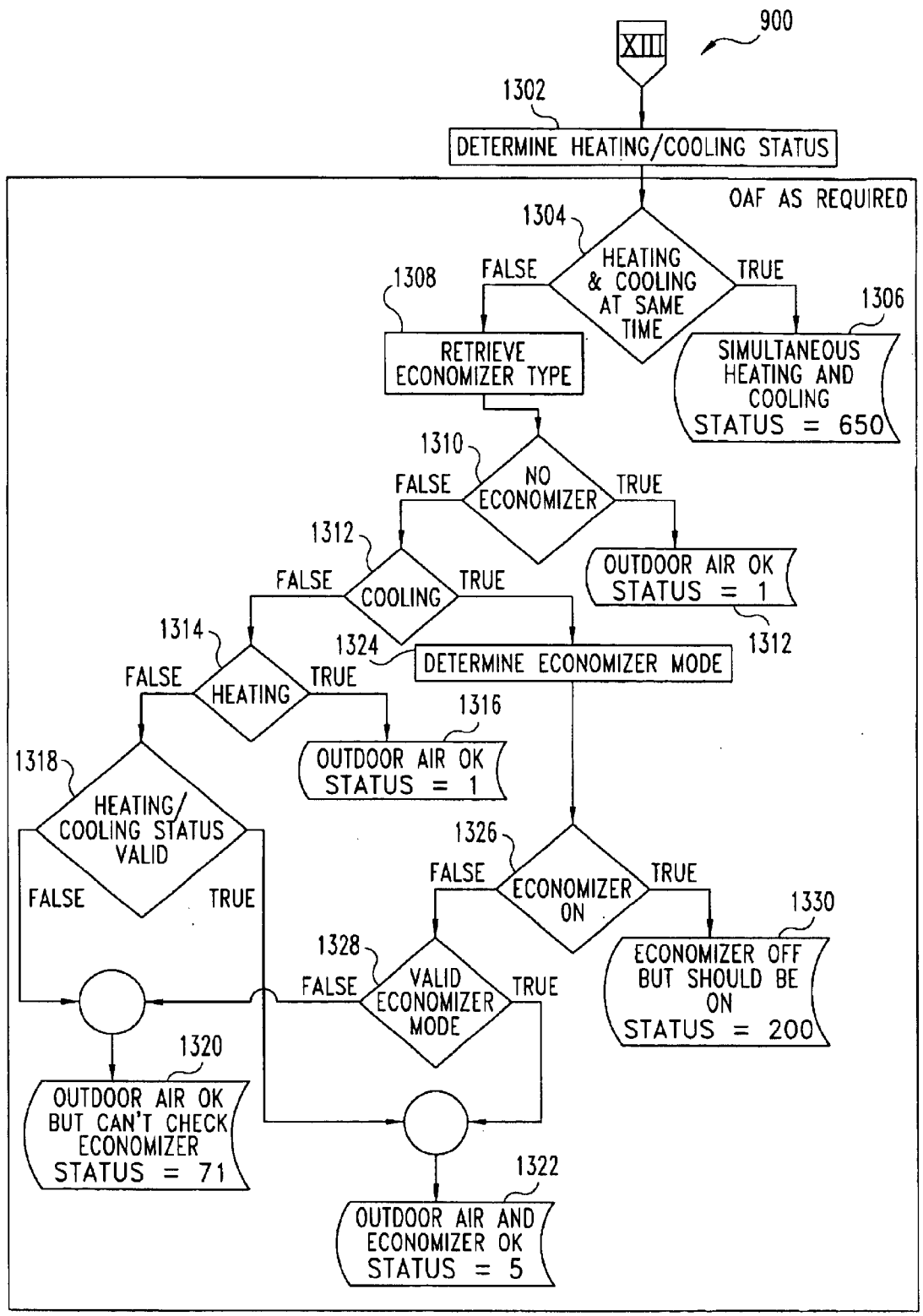
Figure 14:
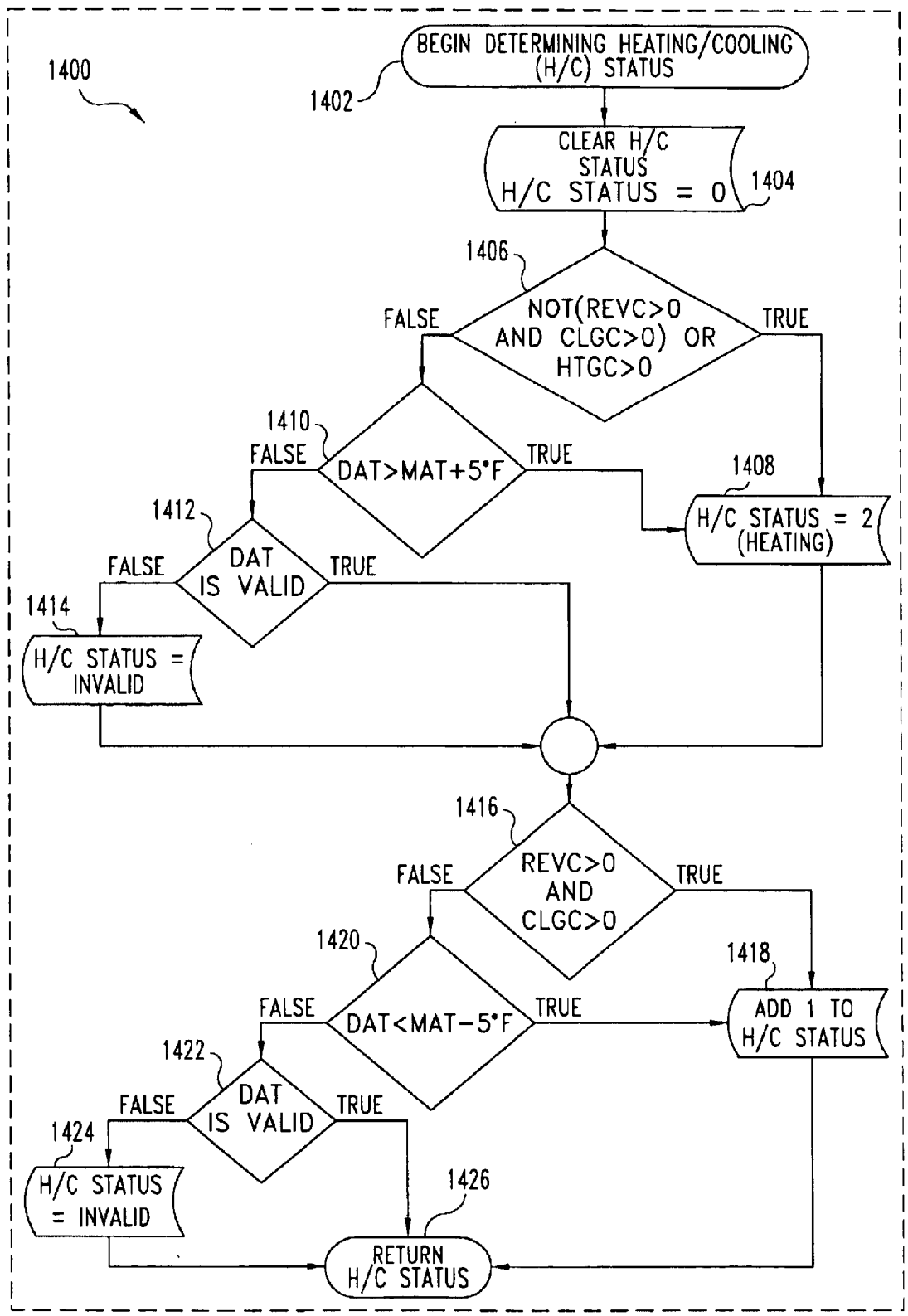
FIG. 14 shows a flow diagram illustrating one technique for determining a heating/cooling status of the HVAC system.

When in stage 1204 the required OAF is valid, the diagnostician 832 next determines the heating/cooling (H/C) status of the HVAC system 1202 in stage 1302 (FIG. 13). A flow chart 1400 illustrating a subroutine for determining the H/C status of the HVAC system 202 is illustrated in FIG. 14. Table 3 below provides an exemplary descriptive guide for the different heating H/C statuses in the H/C subroutine.

TABLE 3

| H/C Status Number | Description |
|---|---|
| 0 | Neither Heating nor Cooling |
| 1 | Cooling |
| 2 | Heating |
| 3 | Heating and Cooling |

As shown above, when the H/C status is zero (0), the HVAC system 202 is neither heating nor cooling. When the H/C status is one (1), the system 202 is cooling, and the system 202 is heating when the H/C status is two (2). A H/C status of three (3) symbolizes that the HVAC system 202 is both heating and cooling. As should be appreciated, different schemes can be used to symbolize the different H/C statuses of the HVAC system 202. In stage 1402, the diagnostician 832 begins H/C status subroutine. Next, in stage 1404, the H/C status, which is stored in memory 256, is cleared by setting the H/C status to zero (0). The diagnostician 832 in stage 1404 determines if the HVAC system 202 is in a heating mode.

As shown in FIG. 2, the controller 204 sends a high signal on the HTGC line 240 when the supplemental heating coils in the HVAC system 202 are heating. Controller 204 uses the reversing control (REVC) valve to control if the HVAC system 202 is in an air conditioning or a heat pump mode. The signal from the REVC line 238 is high (i.e., 1) when the controller has the REVC valve of the heat pump set to cooling mode. The controller 204 sends a high signal on the CLGC line 242 when the HVAC 202 is enabling the compressor of the air conditioner or heat pump.

When the heating control signal from the HTGC sensor 240 is high (greater than zero) in stage 1406, the H/C status is set to equal two (heating) in stage 1408. Alternatively, in stage 1406, if the reverse control signal REVC sensor 238 is not high and the cooling control signal from the CLGC sensor 242 is high, then the H/C status is set to two (heating) in stage 1408. If the conditions in stage 1406 are false, the diagnostician 832 in stage 1410 then checks to see if the HVAC system 202 is heating by comparing the discharge air temperature with the mixed air temperature. If the discharge air temperature supplied to the building, as measured by the DAT sensor 220, is greater (hotter) than the mixed air temperature from MAT sensor 216 plus a temperature differential, in this case 5° F., then the H/C status is set to two (heating) in stage 1408. Otherwise, in stage 1412, the diagnostician 832 checks to see if the sensor information in channel three 816 from the DAT sensor 220 is valid. When the DAT sensor 220 sends an invalid signal, then the H/C status in stage 1414 is set to "invalid". Otherwise, the H/C status is not changed in stage 1412.

After stages 1408, 1412 and 1414 diagnostician 832, then checks to see if the HVAC system 202 is in a cooling mode in stage 1416. If the reversing control valve as indicated by REVC line 238 is active (high) and the cooling control signal as indicated by CLGC line 242 is high, the H/C status is increased by one (1) in stage 1418. For example, if the H/C status is still zero before stage 1416 (neither heating nor cooling) and the condition in stage 1416 is satisfied, the H/C status will be increased to one (1) so as to indicate the HVAC system 202 is in a cooling mode. In another example, if the H/C status was set to two (2), heating, in stage 1408 and the conditions in stage 1416 are satisfied, then the status is increased to three (3) so as to indicate that the HVAC system 202 is both heating and cooling in stage 1418. When conditions in stage 1416 are false, the diagnostician 832 then checks to see if the discharge air temperature is cooler than a certain amount below the mixed air temperature, in this case 5° F., in stage 1420. If the discharge air temperature as sensed by DAT sensor 220 is less than 5° F. below the mixed air temperature, as sensed by MAT sensor 216, then the diagnostician 832 adds one to the H/C status in stage 1418. Otherwise, in stage 1422 the diagnostician 832 checks to see if the sensor information from the DAT sensor 220 is valid. If the discharge air temperature sensor reading is invalid then the H/C status in stage 1424 is changed to invalid. Otherwise, the H/C status is not changed in stage 1422. Following stages 1418, 1422, and 1424, the H/C status in stage 1426 is returned to the requesting routine. As should be appreciated, other H/C status indicators can be returned. For example, the diagnostician 832 can check for temperature reading and control signal inconsistencies in order to detect sensor and/or control errors. Such errors then can be indicated by the H/C status.

As illustrated in FIG. 13, after determining the H/C status in stage 1302, the diagnostician 832 in FIG. 13 then determines if the HVAC system 202 is heating and cooling at the same time (H/C status=3). If simultaneous heating/cooling is occurring, then in stage 1306 the diagnostician 832 reports in the unit status file 834 that simultaneous heating/cooling is occurring (status=650). When the HVAC system 202 is not heating and cooling at the same time, the diagnostician 832 in stage 1308 then retrieves the economized type information from the DX configuration files 846 in stage 1308. For example, the economizer type can equal zero (0) to indicate that no economizer is in use, equal to one (1) when a high limit economizer is in use and equal to two (2) when a differential economizer is in use. The diagnostician 832 then checks in stage 1310 whether or not an economizer is in use (i.e., economizer type=0). When an economizer is not in use, in stage 1312 an outdoor ventilation is acceptable status (status=1) is recorded in the unit status file 834. If the HVAC system 202 is using an economizer, then the diagnostician 832 checks to see whether or not the HVAC system 202 is in a cooling mode (H/C status=1) in stage 1312. If not, the diagnostician 832 in stage 1314 checks to see if the HVAC system 202 is in a heating mode (H/C status=2). In stage 1316, when the HVAC system 202 is heating, the diagnostician 832 reports in the unit status file 834 that the amount of outdoor air used is acceptable (status=1). The diagnostician 832 in stage 1318, when the condition in stage 1314 is false, checks to see if the H/C status stored in memory 256 is valid. When the H/C status is invalid, the unit status 834 is changed to indicate that the outdoor air ventilation is acceptable but the diagnostician 832 is unable to determine the heating or cooling mode (status=71). In stage 1322, when the H/C status is valid, the diagnostician 832 records in the unit status file 834 that the outdoor air amount is acceptable and the economizer is operating properly (status=5). When the diagnostician 832 determines the H/C status is cooling in stage 1312, then the diagnostician 832 determines the economizer operational mode in stage 1324 based on the type of economizer being used.

Figure 15:
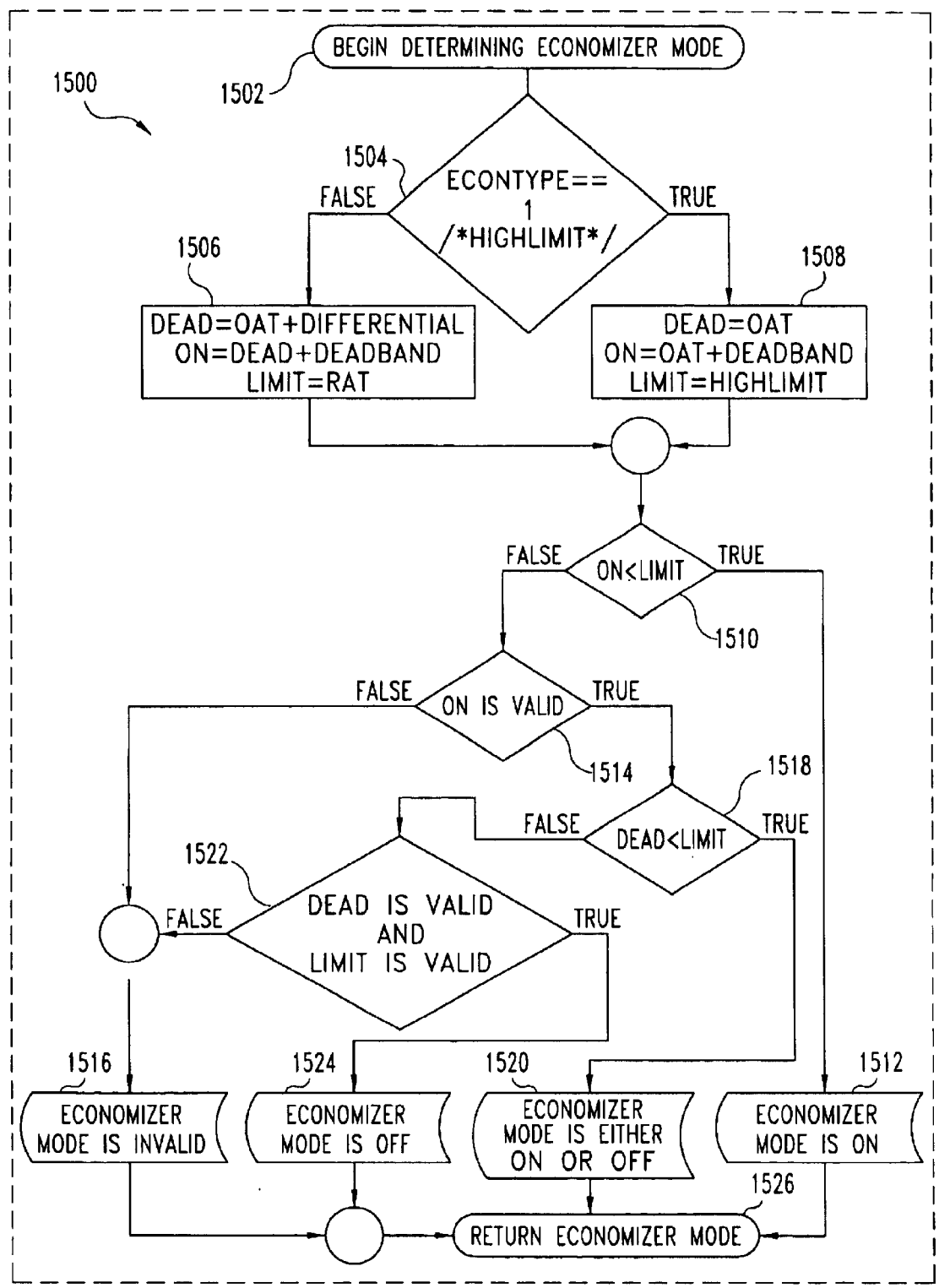
FIG. 15 shows a flow diagram illustrating one technique for determining an economizer mode of the HVAC system.

A flow chart 1500 in FIG. 15 illustrates a subroutine according to one embodiment of the present invention in which the economizer operational mode is determined. The operational mode that is determined in this subroutine is not the actual operational status of the economizer, but rather, the operational status that the economizer should be using. After beginning in stage 1502, the diagnostician 832 in stage 1504 retrieves the economizer type (ECONTYPE) from the DX configuration files 846. Based on the economizer type (high-limit or differential economizers) different parameters will be used in order to determine the economizer mode. These parameters include a DEAD parameter, ON parameter and LIMIT parameter. The DEAD parameter is used to determine if the economizer should be floating either down from being OFF (not operating) or up from being ON (operating). The ON parameter indicates the temperature below which the economizer should operate. The LIMIT parameter is used to indicate the temperature above which the economizer should not operate.

When the economizer type in stage 1504 is not a high-limit type economizer (i.e., a differential type economizer), the DEAD parameter equals the outside air temperature plus a differential temperature value in stage 1506. The differential temperature value is retrieved from the DX configuration files 846. Further, in stage 1506, the ON parameter is determined by adding the DEAD parameter to a DEADBAND parameter that is stored in DX configuration files 846. The DEADBAND parameter specifies a temperature range below the LIMIT temperature parameter in which the economizer should not be operating. The LIMIT parameter is set to the return air temperature in stage 1506. Alternatively, when the economizer is a high-limit type economizer, the DEAD temperature parameter equals the outside temperature. Further, the ON parameter equals the outside air temperature plus the DEADBAND temperature parameter from the DX configuration files 846. In stage 1504, the LIMIT temperature parameter equals a high temperature limit, which is specified in the DX configuration files 846. In one embodiment, the HIGHLIMIT is 75° F., the DEADBAND parameter is 10° F., and the DIFFERENTIAL is 5° F. It should be appreciated that other parameter values can be used.

Following stages 1506 and 1508, the diagnostician 832 in stage 1510 determines if the calculated ON parameter value is less than the LIMIT parameter value. When the ON value is less than the LIMIT value, the diagnostician 832 determines that the economizer is "ON" in stage 1512, and an economizer mode of "ON" is stored in memory 256. Different types of indicators can be used to symbolize the economizer operational mode. For example, the economizer mode can be "invalid", "0", "1" and "2" when the economizer mode is invalid, the economizer is "OFF", the economizer is either "ON" or "OFF", and the economizer is "ON", respectively. When the ON value is not less than the LIMIT value, the diagnostician 832 in stage 1514 then checks to see if the ON value is valid (i.e., not null). The ON parameter value can be invalid for a number of reasons. For example, the ON value can be invalid when the OAT sensor 214 is not operational. In stage 1516, when the ON value is invalid, the economizer mode is registered in memory 526 as being invalid. On the other hand, if the ON value in stage 1514 is valid, then in stage 1518 the diagnostician 832 determines whether or not the temperature at which the economizer should be off (dead value) is less than the LIMIT parameter value. If so, in stage 1520 the economizer mode is registered in memory 526 as being either on or off. This situation can occur for example in a high-limit economizer when the outside air temperature is within the dead band temperature range that is below the high temperature limit. When the condition in stage 1518 is not satisfied, the diagnostician 832 then determines if the calculated DEAD and LIMIT values are valid in stage 1522. If both are valid, then the diagnostician 832 registers in memory 256 that the economizer mode is "OFF" in stage 524. Otherwise, the economizer mode in stage 1516 is registered as "INVALID" in memory 256. After stages 1512, 1516, 1520 or 1524, the economizer mode is returned to the calling routine.

As illustrated in FIG. 13, after determining the economizer mode in stage 1324, the diagnostician 832 determines if the economizer mode is only "ON" in stage 1326 (i.e., economizer mode=2). When the economizer is not only "ON", such that economizer mode is "INVALID", "OFF" or "EITHER ON OR OFF", then in stage 1328 the diagnostician 832 determines if a valid economizer mode is registered in memory 256. When the economizer mode is invalid, then in stage 1320 the unit status file 834 is modified to indicate that the outdoor air flow is acceptable but the diagnostician 832 cannot check the economizer status (status=71) in stage 1320. Otherwise, when the economizer mode is valid, a status indicating that outdoor air ventilation is acceptable and economizer status is acceptable is recorded (status=5) in the unit status file 834. When the economizer is "ON" in stage 1326, the diagnostician 832 registers in the unit status file 834 that the economizer is off but should be operating in stage 1330 (status=200).

Figure 16:
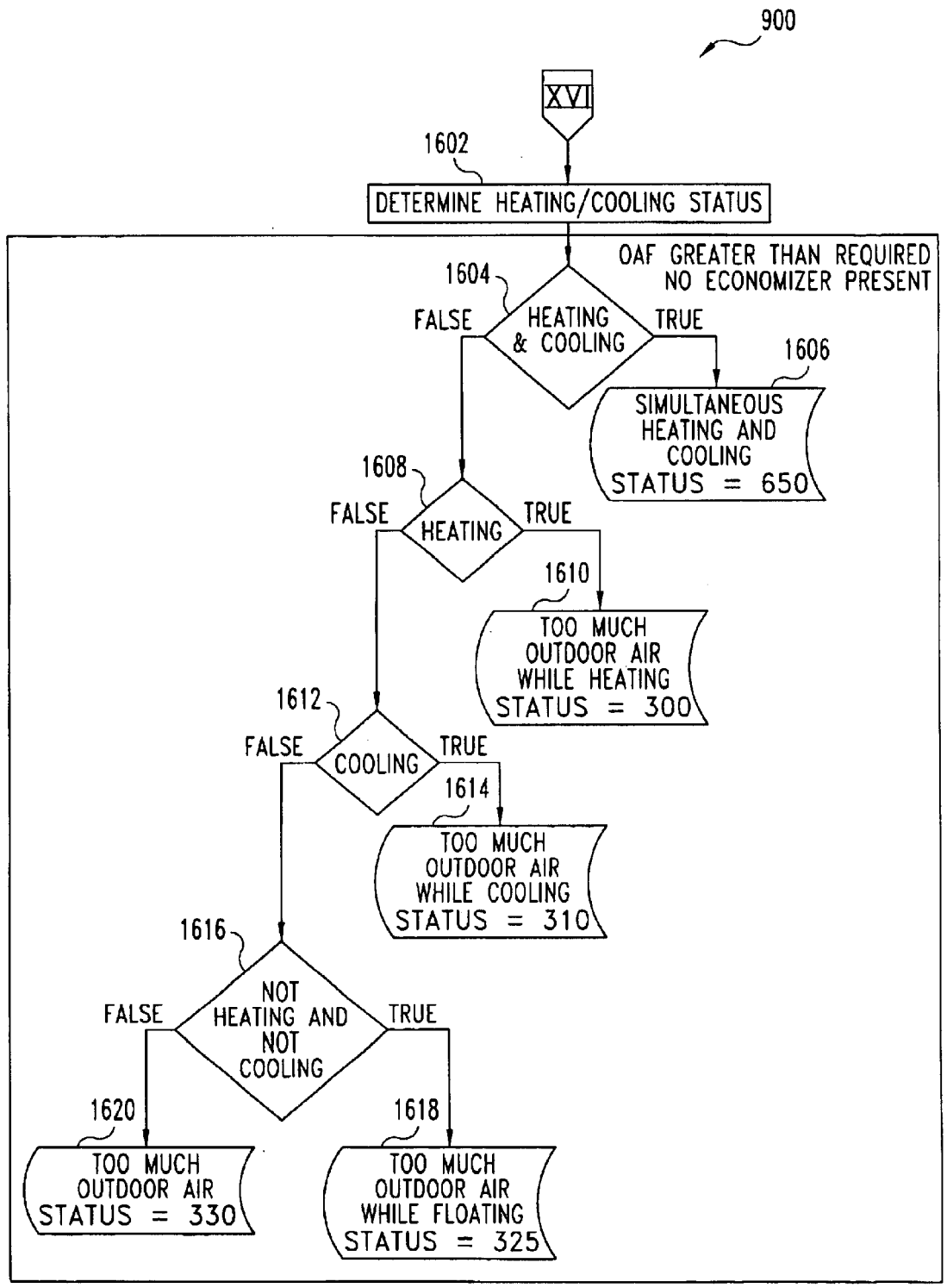
Figure 17:
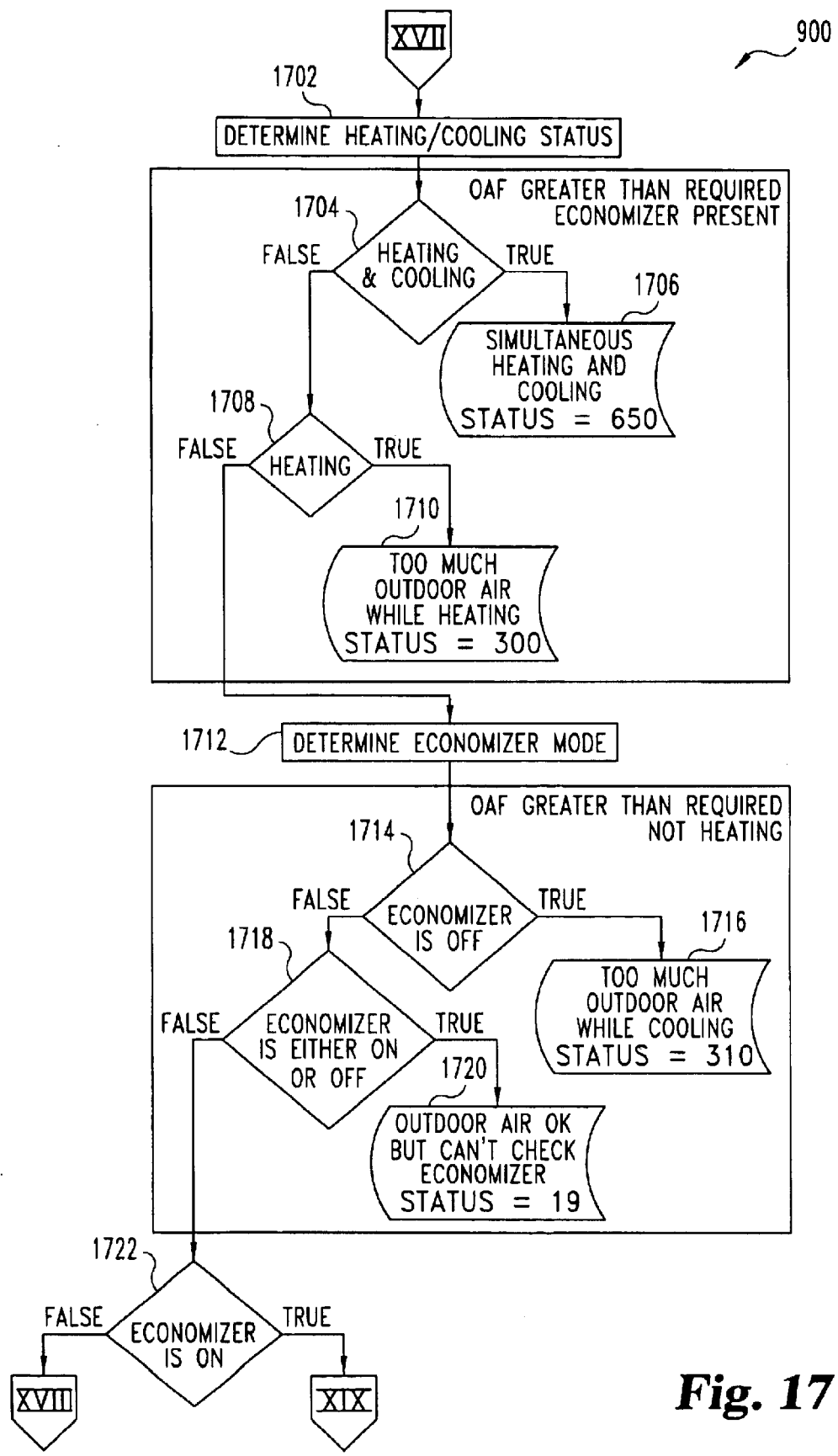

In FIG. 12, when in stage 1202 the OAF is greater than the required OAF, the diagnostician 832 determines from the economizer type whether the HVAC system 202 has an economizer in stage 1208. When the HVAC system 202 is not using an economizer, the diagnostician 832 then determines the H/C status in stage 1602, which is illustrated in FIG. 16. In one form, the diagnostician 832 determines the H/C status by using the heating/cooling subroutine that was described above with reference to flow diagram 1400 in FIG. 14. After determining the H/C status in stage 1602, the diagnostician 832 determines in stage 1604 whether the HVAC system 202 is both heating and cooling at the same time (H/C status=3). If so, then the diagnostician 832 registers in the unit status file 834 that simultaneous heating and cooling is occurring (status=650) in stage 1606. When the HVAC system 202 is not heating and cooling, the diagnostician 832 then determines if the HVAC system 202 is heating in stage 1608. If system 202 is heating, the system status in the unit status file 834 is changed to indicate that too much outdoor air is being used while heating in stage 1610 (status=300). This occurs because the OAF is greater than what is required for heating. Otherwise, when the condition in stage 1608 is not satisfied, the diagnostician 832 in stage 1612 checks the H/C status to see if the HVAC system 202 is in a cooling mode. If so, in stage 1614 the unit status file 834 is modified to indicate that too much outdoor air is being used while cooling (status=310). In stage 1616, the diagnostician 832 determines if the HVAC system 202 is not heating and not cooling (H/C status=0). When true, in stage 1618 the diagnostician 832 changes unit status 834 to reflect that too much outdoor air is being used while in a floating mode in which the system 220 is not heating and not cooling (status=325). If conditions in stage 1616 are not satisfied then the unit status file 834 is changed to reflect that too much outdoor air is being used (status=330) in stage 1620.

As shown in FIG. 12, when in stage 1208 the processor 254 determines through the diagnostician 832 that the HVAC system 202 is using an economizer, the diagnostician 832 then determines in stage 1702 (FIG. 17) the H/C status of the HVAC system 202. The H/C status is determined in stage 1702 using the heating/cooling status subroutine, which is illustrated in flow diagram 1400 in FIG. 14. After determining the H/C status, the diagnostician 832 determines in stage 1704 if the HVAC system 202 is both heating and cooling at the same time. If true, the unit status file 834 is modified to reflect that simultaneous heating and cooling are occurring in stage 1706 (status=650). If false, the H/C status is checked to see if the HVAC system 202 is heating (H/C status=2). When the HVAC system 202 is heating, the unit status file 834 is changed to reflect that too much outdoor air is being used while heating (status=300) in stage 1710.

When the HVAC system 202 is not heating, the diagnostician 832 then determines the economizer mode in stage 1712. The economizer mode is determined by using economizer mode subroutine, which is depicted by flow diagram 1500 in FIG. 15. After determining the economizer mode, the processor 254 through diagnostician 832 determines if the economizer mode is set to "OFF" in stage 1714. If the economizer mode is "OFF", the diagnostician 832 in stage 1716 reports in the unit status file 834 that too much outdoor air is being used while cooling (status=310). When the condition in stage 1714 is not satisfied, the diagnostician 832 then checks to see if the economizer has been determined to be either on or off (in a floating mode) in stage 1718. In stage 1720, when the economizer mode is set to "ON or OFF" (i.e., economizer mode=1), the unit status field 834 is updated to reflect that the amount of outdoor air ventilation is acceptable but the diagnostician 832 is unable to check the economizer operation (status=19). When the condition in stage 1718 is not satisfied, the diagnostician 832 then determines in stage 1722 whether the economizer is "ON".

Figure 18:
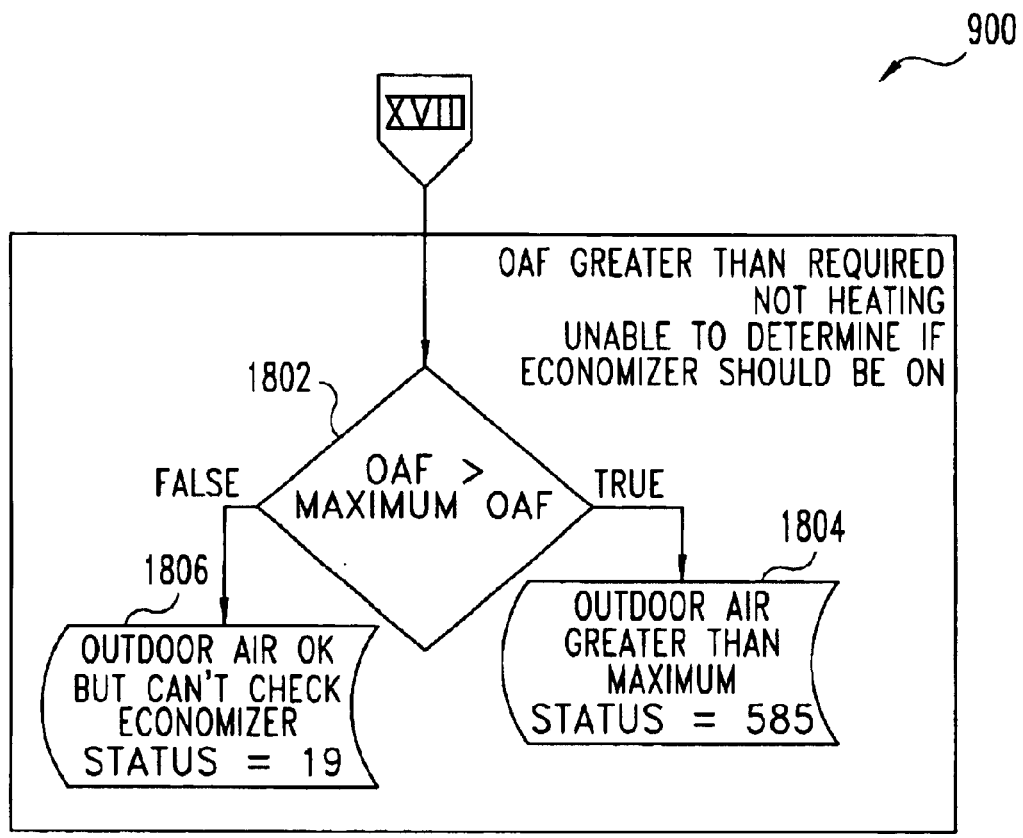
Figure 19:
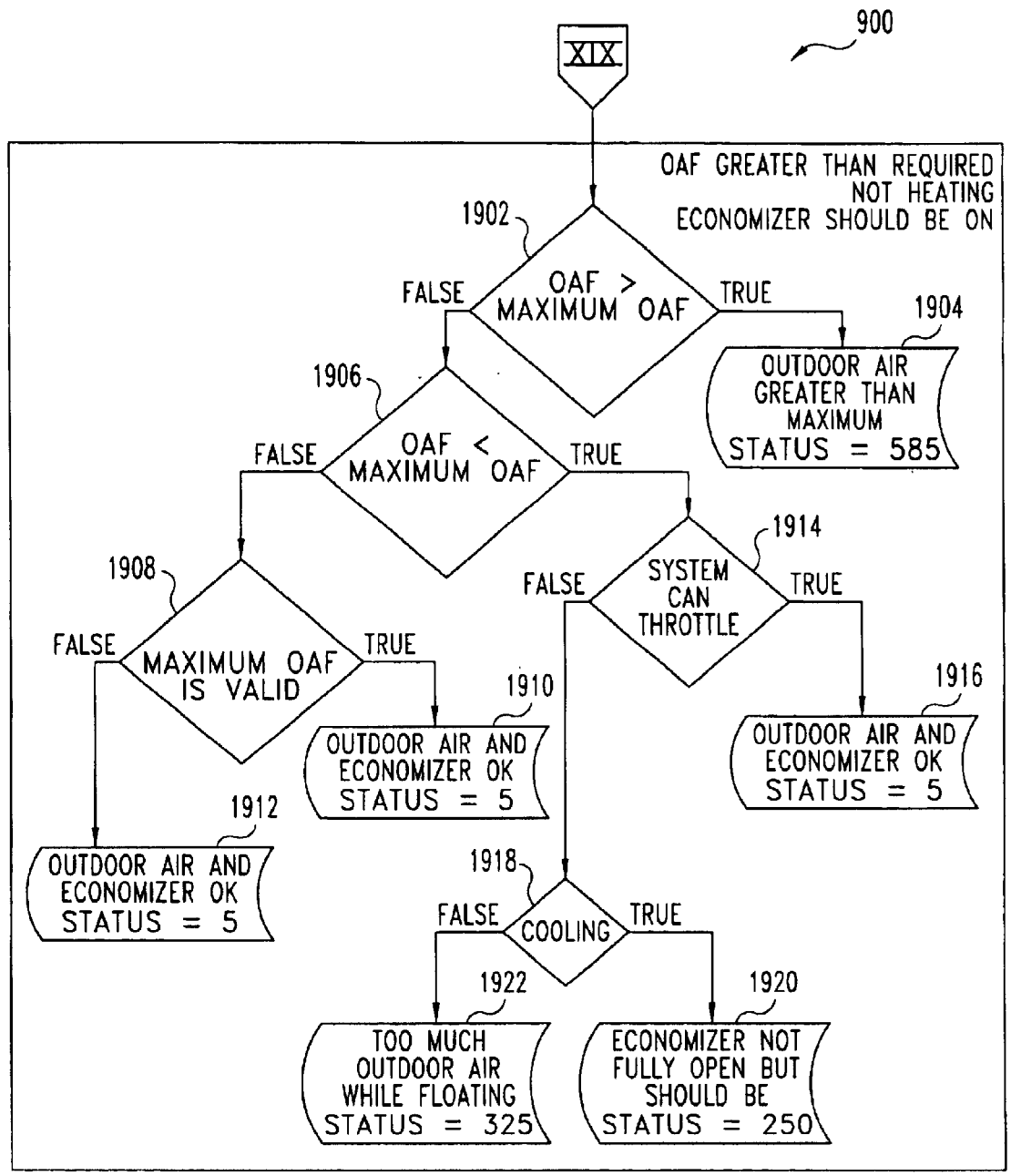

As depicted in FIG. 18, when the diagnostician 832 is unable to determine whether the economizer should be "ON", the diagnostician 832 in stage 1802 determines if the OAF is greater than the maximum OAF, which is stored in DX configuration files 846. If true, the diagnostician 832 modifies the unit status 834 to indicate that the outdoor airflow is greater than the specified maximum outdoor airflow limit in stage 1804 (status=585). Otherwise, in stage 1806, the unit status file 834 is changed to reflect that the outdoor airflow is adequate but the operation of the economizer cannot be checked (status=19).

When the diagnostician 832 in stage 1722 (FIG. 17) determines that the economizer should be "on", the diagnostician 832 in stage 1902 (FIG. 19) determines if the OAF is greater than the specified maximum OAF. If true, the unit status file 834 is changed to reflect that the outdoor airflow is greater than the maximum outdoor airflow in stage 1904 (status=585). When the condition in stage 1902 is false, the diagnostician 832 in stage 1906 determines whether the OAF is less than the maximum OAF. When the OAF is not less than the maximum OAF, the diagnostician 832 in stage 1908 determines if the maximum OAF is a valid value. For example, the maximum OAF value can be invalid if the DX configuration files 846 are corrupted. The diagnostician 832, when the maximum OAF value is valid in stage 1910, modifies the unit status file 834 to indicate that the outdoor air flow is acceptable and the economizer is operating properly (status=5). Otherwise, in stage 1912 the diagnostician 832 modifies the unit status file 834 to reflect the outdoor air ventilation is acceptable and the economizer is operating properly (status=5). When in stage 1906 the calculated OAF is less than the maximum OAF, the diagnostician 832 in stage 1914 determines whether the HVAC system 202 has the ability to throttle the economizer dampers 208. The diagnostician retrieves this throttling information from the DX configuration files 846. When the HVAC system 202 is able to throttle, the unit status file 834 is modified to reflect that the outdoor airflow is acceptable and the economizer is operating properly (status=5). When the system 202 cannot throttle, in stage 1918, the diagnostician 832 determines whether or not the HVAC system 202 is cooling (H/C status=1). When cooling, the unit status file 834 is changed to show that the economizer dampers 208 are not fully open but should be in stage 1920 (status equals 250). Otherwise, in stage 1922 the unit status file 834 is changed to reflect that too much outdoor air ventilation is being used while the HVAC system 202 is floating (status=325).

As shown in FIGS. 8A–B, a web server 848 supplies the web data 822 to the monitoring facility (FIG. 1) over computer network 106. Web configuration files 850 are used to configure the web server 848. In one embodiment, the web server 848 is an Apache web server. An Internet service daemon 852 is used to control communications between the web server 848 and the computer network 106. Internet service configuration files 854 are used to configure the Internet service daemon 852. The Internet service daemon 852 uses a TCP/IP (Transmission Control Protocol/Internet Protocol) 856 to communicate over computer network 106. It should be appreciated that other types of network protocols can be used. In one embodiment, the Internet service daemon 852 is a "Internet super server" daemon (inetd) that is used to manage communication over the computer network 106. As should be appreciated, stand-alone service daemons can also be used for communication over computer network 106.

Figure 20:
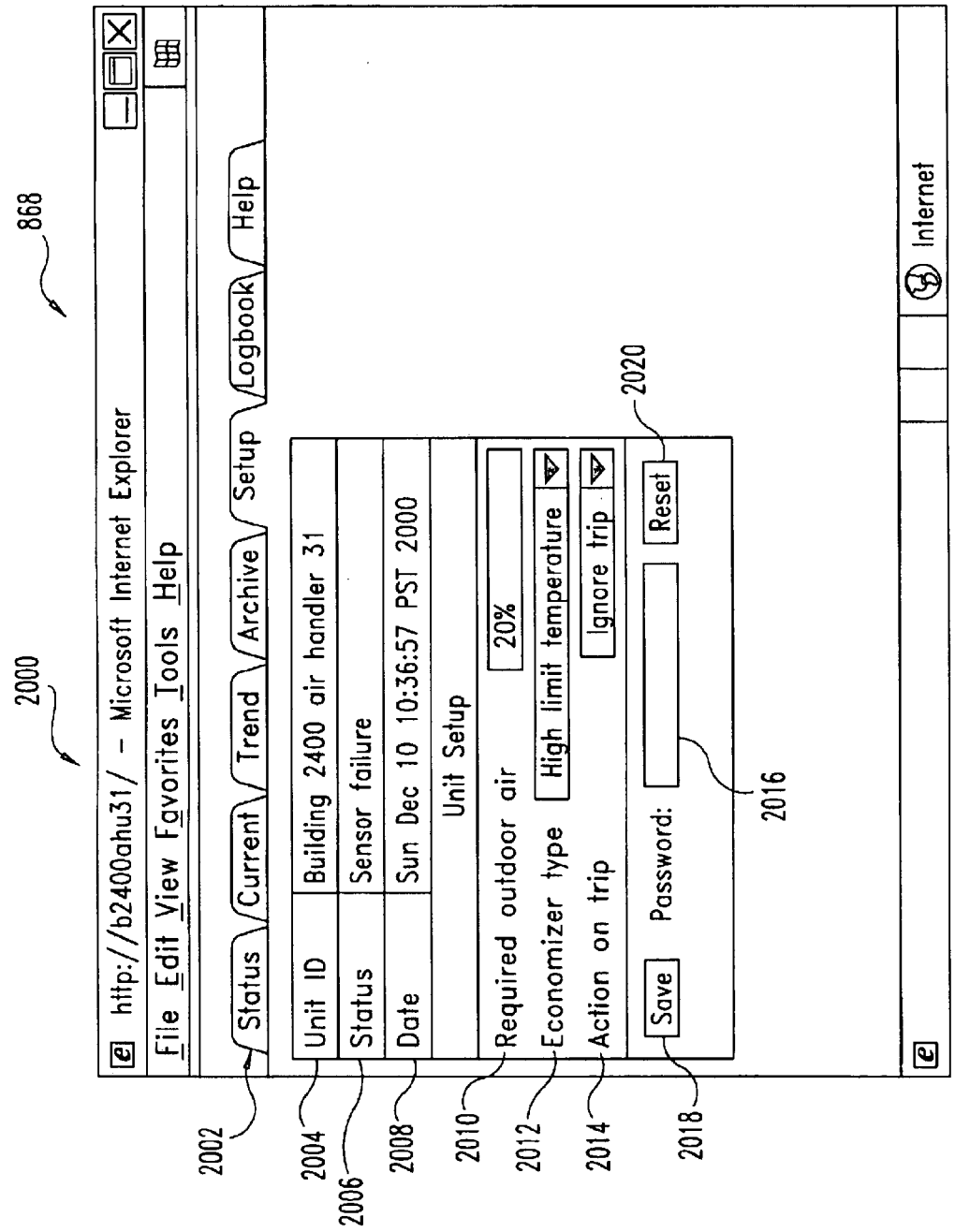
FIG. 20 shows a setup display screen for the system of FIG. 1.

System 800, as shown in FIG. 8A, includes a web pages directory 858, a web images directory 860, a web scripts directory 862, and a web help directory 864. The web pages directory 858 contains a number of web pages 866 that are generated in part based on the information contained in the web data directory 822. These web pages 866 in the web pages directory 858 include a setup page 868, a status page 870, a trend page 872, a sensor page 874, an archive page 876, a log book page 878, and a help page 880. An example of setup page 868, which can be displayed at monitoring facility 102 and/or in service vehicle 104, is depicted in FIG. 20. As shown, screen 2000 includes a number of tabs 2002 that are used to navigate between various pages 866. Unit ID field 2004 identifies a particular HVAC system 202 that is located at a particular equipment site 108. The communication system 100 according to the present invention allows a service technician to monitor various HVAC systems 202 at different equipment sites 108. The operational status of the particular HVAC system 202 (unit) is displayed in field 2006, and the current date and time are displayed in field 2008. The web server 848 generates the unit status field 2006 based on the status information contained in the unit status file 834. The service technician can set the required OAF value in field 2010. To indicate the economizer type or if an economizer is being used, the operator at the monitoring facility 102 can set the economizer type in field 2012. The diagnostic action taken on receiving a "trip" signal on TRIP communication pathway 236 is set in field 2014. In one embodiment, upon receipt of the "trip" signal a trend log dump can be initiated and/or a telephone call to the monitoring facility 102 can be placed. As should be appreciated, this "trip" signal can also be ignored. Password information is entered into field 2016. The information entered into screen 2000 can be saved by selecting the save button 2018, and the fields can be reset by selecting reset button 2020.

Figure 21:
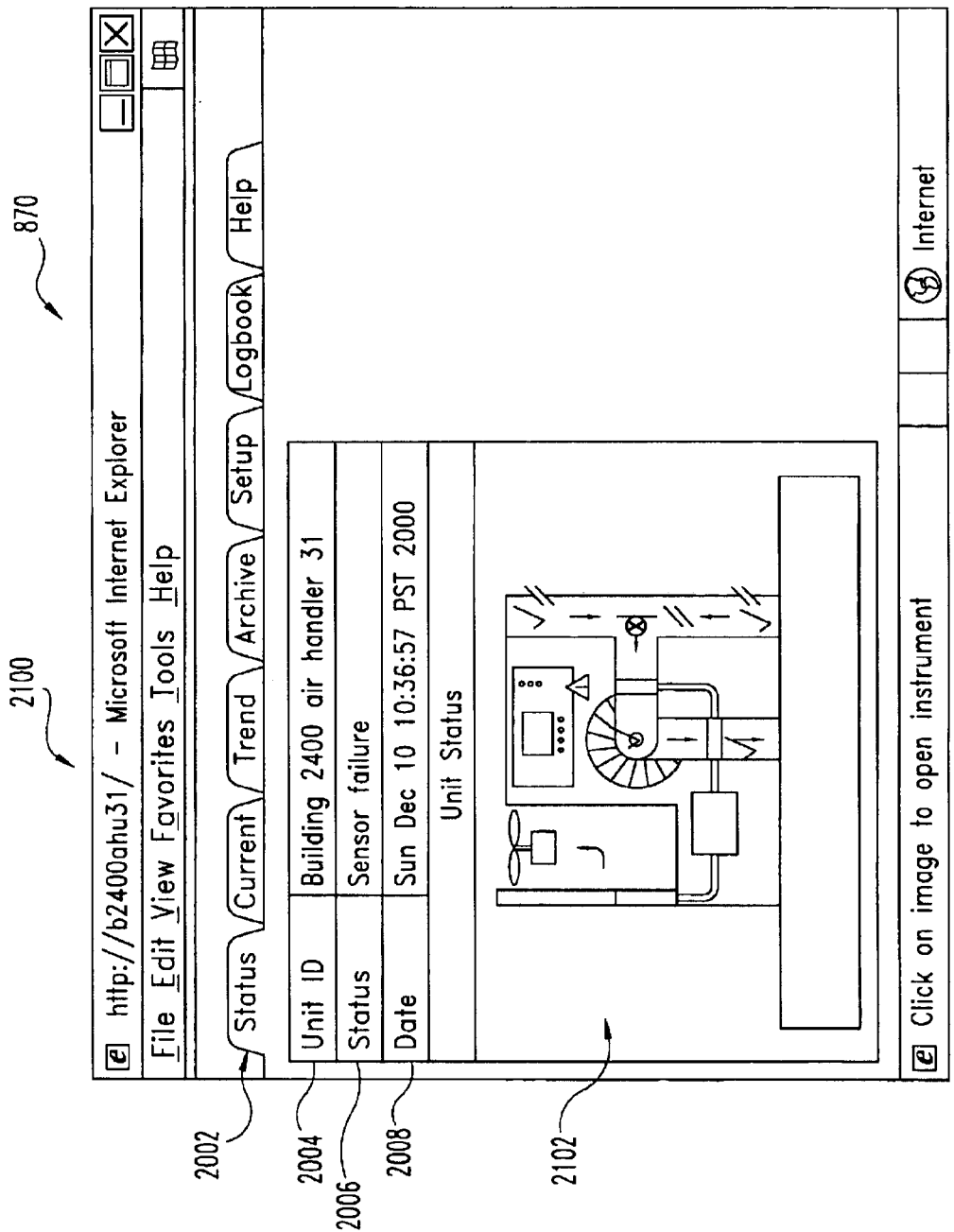
FIG. 21 shows a status display screen for the system of FIG. 1.

An example of a status page 870 is illustrated in FIG. 21. As shown, screen 2100 includes navigation tabs 2002, a unit ID field 2004, a status field 2006, and a date/time field 2008. As mentioned above, the diagnostician 832 determines the current status of a selected HVAC system 202, and this unit status information is stored in the unit status file 834. The web server 848 uses the information in unit status file 834 to create the sensor status field 2006. Screen 2100 further includes an equipment representation/picture field 2102. Icons 882 and images 884 are stored in the web images directory 860. The image field 2102 is generated from the images stored in the image files 884. Any web scripts 886 that are used by the web server 848 are stored in the web scripts directory 862.

Figure 22:
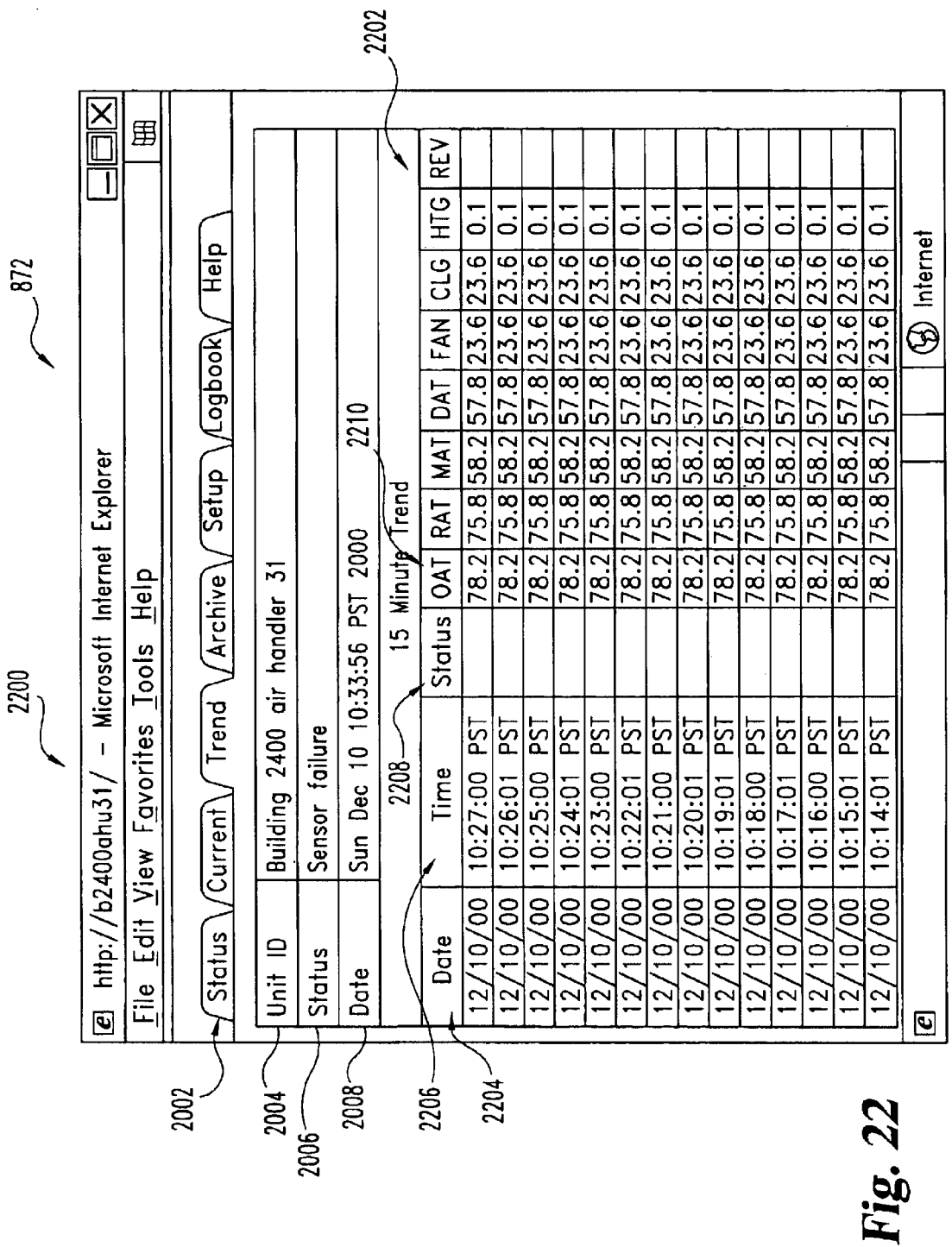
FIG. 22 shows a trend display screen for the system of FIG. 1.

In FIG. 22, an example of a trend page 872 is shown in display screen 2200. Display screen 2200 can be used to monitor the conditions of the HVAC system 202 remotely at monitoring facility 102. Screen 2200 includes a number of navigation tabs 2002, unit ID field 2004, status field 2006, and date field 2008. Screen 2200 further includes a trend portion 2202 in which trend information from the sensors 212 is displayed. As discussed above, this trending information is generated by the processor 254 through the trending system 824. The web server 848 retrieves the trend information from the trend information file 826 that is created by the trending system 824. Trend portion 2202 includes a date column 2204 in which the date of the reading is listed, a time column 2206 in which the time of the individual readings are listed, a status column 2208 listing the status of the HVAC system 202 at that time, and multiple sensor reading columns 2210 that lists the readings for the particular sensors 212 at the displayed time.

Figure 23:
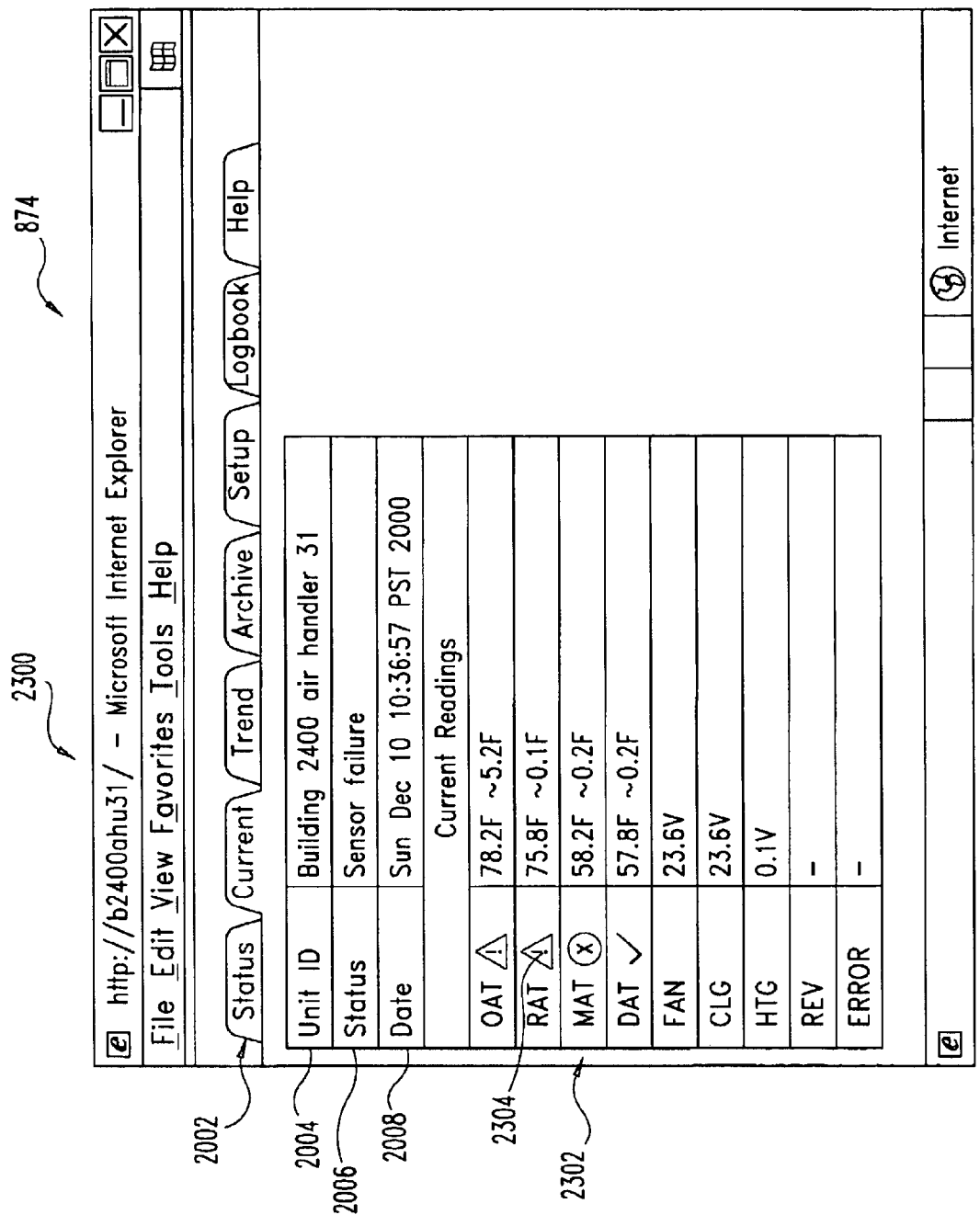
FIG. 23 shows a current status display screen for the system of FIG. 1.

An example of sensor page 874 is depicted with screen 2300 in FIG. 23. The information contained in screen 2300 can be used to monitor the current status of particular sensors 212. Screen 2300 includes navigation tabs 2002, unit ID field 2004, status field 2006, and date field 2008. Screen 2300 further includes one or more sensor reading fields 2302. Individual fields 2302 contain status icons 2304, which alert the technician as to the status of particular sensors 212. These icons are retrieved by the web server 848 from the icon file 882. The web server 848 retrieves the information for the current reading fields 2302 from the sensor channels 812 in the web data directory 822. The web server 848 initiates a request with the file system 810 for the particular sensor channel files 812. In response, the device driver 802 generates the channels 812 from which the web server 848 can generate screen 2300.

Figure 24:
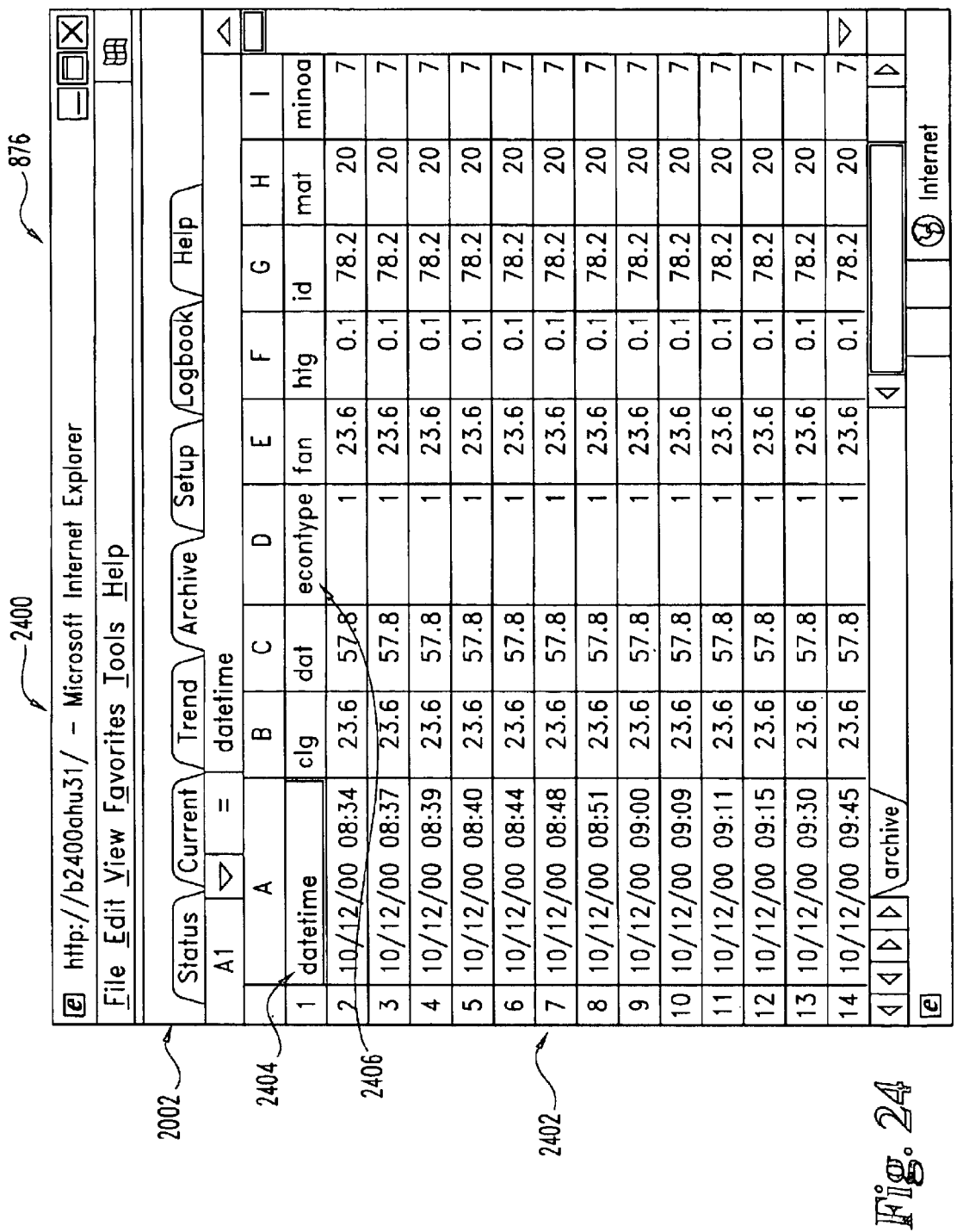
FIG. 24 shows an archive display screen for the system of FIG. 1.

Screen 2400 in FIG. 24 illustrates an example of an archive page 876 according to one embodiment of the present invention. Screen 2400 includes multiple navigation tabs 2002 and an archive list portion 2402. The archive portion 2402 includes a date/time column 2404 in which the date and time for the readings is displayed and one or more archived reading columns 2406. As discussed above, the archival system 828 takes readings from the trending system 824 and stores them into the permanent archive file 830 in memory 256. The web server 848 retrieves the information from the permanent archive 830 so as to generate screen 2400. In one embodiment, the readings are archived every fifteen minutes. It should be appreciated that different archiving periods may be used.

Figure 25:
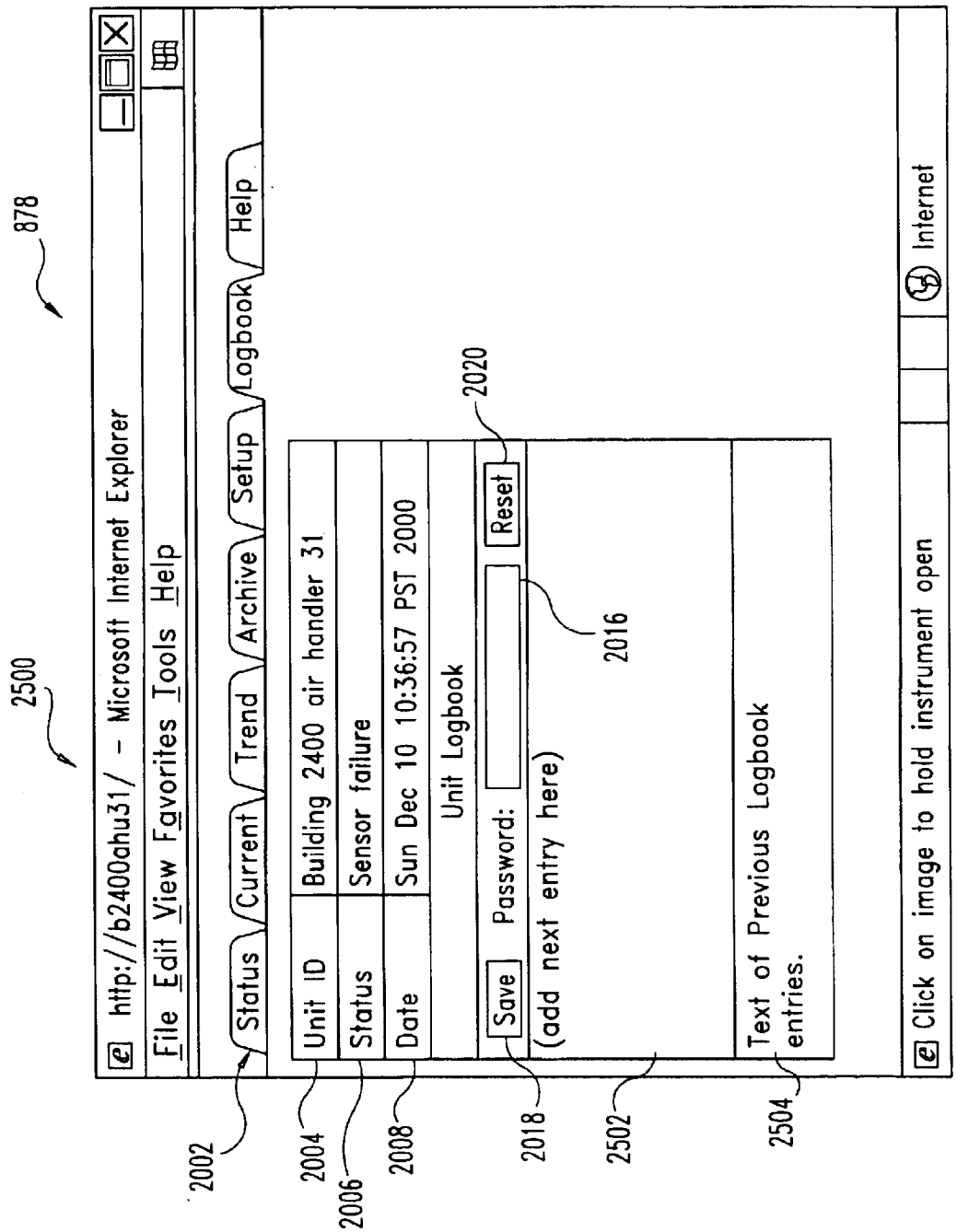
FIG. 25 shows a log book entry display screen for the system of FIG. 1.

Screen 2500 in FIG. 25 illustrates an example of a logbook page 878 according to one embodiment of the present invention. Screen 2500 includes one or more navigation tabs 2002, unit ID field 2004, status field 2006, and date/time field 2008. In addition, screen 2500 includes password field 2016, save button 2018, and reset button 2020. The password field 2016 is used to require entry of a password in order to create a new log book entry for a selected HVAC system 202. The particular log book entry is typed into logbook entry field 2502. Previous log book entries are displayed in field 2504. To save the entry, save button 2018 is selected. Reset button 2020 clears the entry in the log book entry portion 2502.

Figure 26:
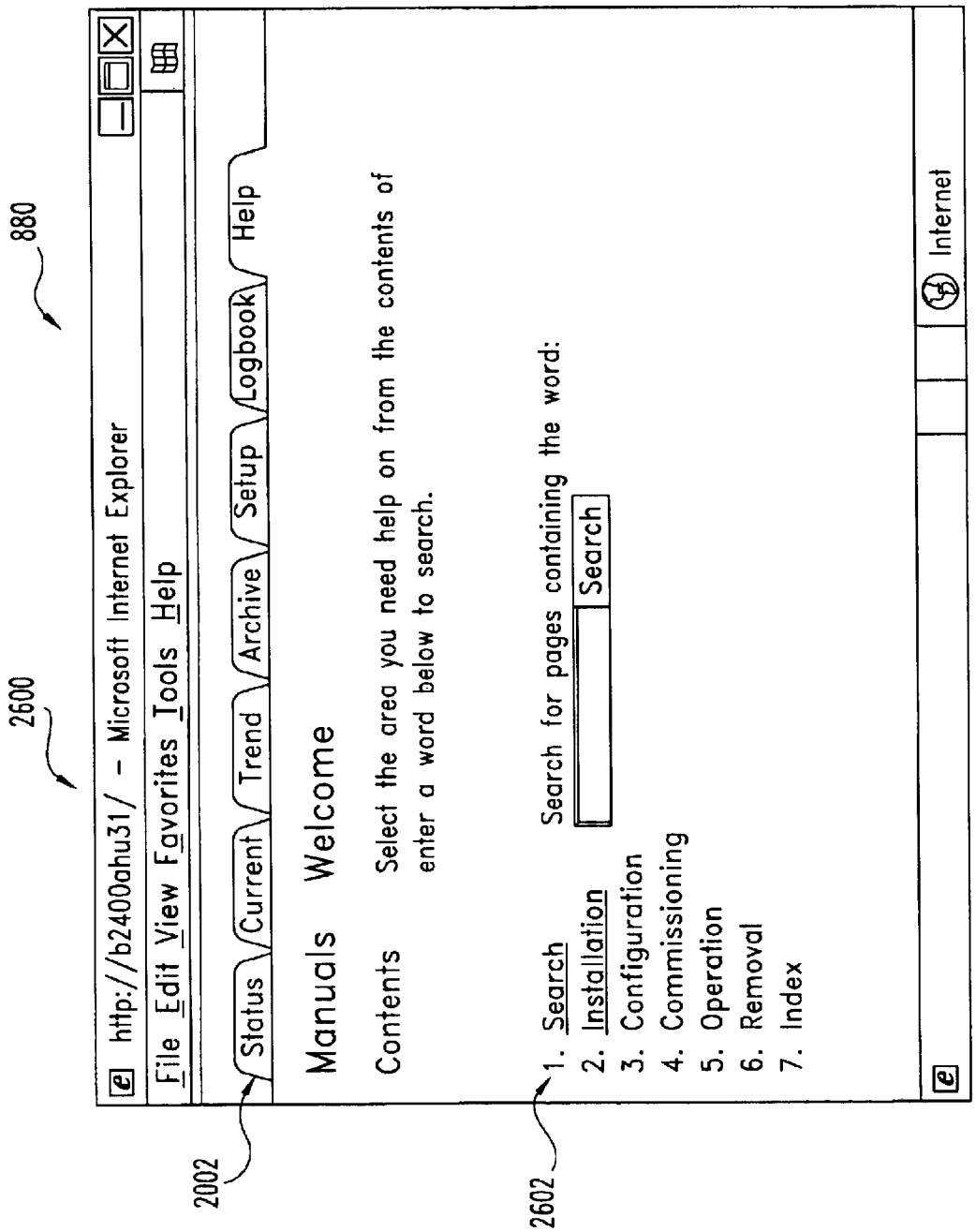
FIG. 26 shows a help display screen for the system of FIG. 1.

FIG. 26 illustrates an example of a help page 880 according to one embodiment of the present invention. In screen 2600, navigation tabs 2002 are used to navigate between the various pages 866. Help section 2602 of screen 2600 allows the user to access additional help pages 888, which are stored in the help directory 864.

In another embodiment of the present invention, OAT sensor 214, MAT sensor 216, RAT sensor 218 and DAT sensor 220 are retrofitted to the HVAC system 202. Processor 254 is operable to determine the status of the HVAC system 202 through the sensors 212, building occupancy status and OAF requirements.

While specific embodiments of the present invention have been shown and described in detail, the breadth and scope of the present invention should not be limited to the above-described exemplary embodiments, but should be defined only in accordance with the following claims and their equivalents. All changes and modifications that come within the spirit of the invention are desired to be protected.

What is claimed is:

1. A method, comprising:
   determining occupancy of a building with a processor, wherein the building has an air treatment system with a fan;
   determining operational status of the fan with the processor;
   calculating an outdoor air fraction of the system with the processor;
   determining validity of the outdoor air fraction with the processor;
   determining outdoor air fraction status with the processor by comparing the outdoor air fraction to a required outdoor air fraction for the building;
   determining current mode status with the processor by comparing the outdoor air fraction with current mode of operation of the system;
   determining unit status of the system with the processor based at least on the occupancy of the building, the operational status of the fan, the validity of the outdoor air fraction, the outdoor air fraction status, and the current mode status; and
   providing output based at least in part on the unit status.

2. The method of claim 1, wherein:
   said determining operational status of the fan includes receiving a fan signal from a fan sensor operatively coupled the processor;
   said determining the occupancy of the building includes determining validity of the fan signal; and
   said determining the unit status is based on the validity of the fan signal.

3. The method of claim 1, wherein said calculating the outdoor air fraction includes:
   measuring a return air temperature in the system with a return air temperature sensor operatively coupled to the processor;

measuring an outdoor air temperature in the system with an outdoor air temperature sensor operatively coupled to the processor;

measuring a mixed air temperature in the system with a mixed air temperature sensor operatively coupled to the processor; and wherein the outdoor air fraction is based on the difference between the mixed air temperature and the return air temperature divided by the difference between the outdoor air temperature and the return air temperature.

4. The method of claim 3, wherein:

said determining the unit status includes validity checking the return air temperature, the mixed air temperature and the outdoor air temperature; and the unit status is based on said validity checking.

5. The method of claim 1, wherein:

said determining the outdoor air fraction status includes establishing that the outdoor air fraction is less than the required outdoor air fraction; and said determining the unit status establishing the unit status as low outdoor air supply.

6. The method of claim 1, wherein said providing the output includes displaying the unit status in a status page at a remote monitoring facility.

7. A system, comprising:

means for determining occupancy of a building, wherein said building has an air treatment system with a fan;

means for determining operational status of said fan;

means for calculating an outdoor air fraction of said system;

means for determining validity of said outdoor air fraction;

means for determining outdoor air fraction status by comparing said outdoor air fraction to a required outdoor air fraction for said building;

means for determining current mode status by comparing said outdoor air fraction with current mode of operation of said system; and means for determining unit status of said system based at least on said occupancy of said building, said operational status of said fan, said validity of said outdoor air fraction, said outdoor air fraction status, and said current mode status.

8. A system, comprising:

a processor operable to determine a unit status of an air treatment system for a building;

a fan sensor operatively coupled to the processor for determining an operational status of a fan in the air treatment system, wherein the processor is operable to determine occupancy of the building based on the fan sensor;

a return air sensor operatively coupled to the processor for sensing return air temperature in the air treatment system;

an outdoor air sensor operatively coupled to the processor for sensing outside air temperature;

a mixed air temperature sensor operatively coupled to the processor for sensing mixed sir temperature in the air treatment system;

wherein the processor is operable to determine an outdoor air fraction based on the return air temperature, the outdoor air temperature, and the mixed air temperature, the processor being operable to determine an outdoor air fraction status by comparing the outdoor air fraction to a required outdoor air fraction for the building, wherein the processor is operable to determine a heating/cooling mode status of the air treatment system by comparing the outdoor air fraction with a current heating/cooling mode of the air treatment system; and wherein the processor is operable to determine the unit status of the air treatment system based on the occupancy of the building, the operational status of the fan, the validity of the outdoor air fraction, the outdoor air fraction status, and the heating cooling mode status of the air treatment system.

9. The system of claim 8, wherein the outdoor air fraction is based on the difference between the mixed air temperature and the return air temperature divided by the difference between the outdoor air temperature and the return air temperature.

10. The system of claim 8, further comprising the air treatment system.

11. The system of claim 10, further comprising:

wherein the air treatment system includes a controller that is operatively coupled to the processor;

wherein the air treatment system includes a supplemental heating coil for heating, a reversing control valve for switching between an air conditioning mode and a heat pump mode in the air treatment system, and a compressor;

a heating sensor operatively coupled to the controller for sensing a heating status of the heating coil;

a reversing control valve sensor operatively coupled to the controller for sensing a reversing control valve status of the reversing control valve;

a cooling sensor operatively coupled to the controller for sensing a cooling status of the compressor;

wherein the controller is operable to send to the processor the heating status, the reversing control valve status, and the cooling status; and wherein the processor is operable to determine the current heating/cooling mode based on the heating status, the reversing control valve status, and the cooling status.

* * * * *

UNITED STATES PATENT AND TRADEMARK OFFICE
CERTIFICATE OF CORRECTION

PATENT NO. : 6,778,945 B2
DATED : August 17, 2004
INVENTOR(S) : David P. Chassin et al.

It is certified that error appears in the above-identified patent and that said Letters Patent is hereby corrected as shown below:

Column 26,
Line 7, replace "mixed sir" with -- mixed air --.

Signed and Sealed this

Twenty-first Day of December, 2004

JON W. DUDAS
*Director of the United States Patent and Trademark Office*